(12) United States Patent
Suzuki

(10) Patent No.: US 12,502,800 B2
(45) Date of Patent: Dec. 23, 2025

(54) ROBOT FOR PERFORMING SCRAPING, ROBOT SYSTEM, METHOD, AND COMPUTER PROGRAM

(71) Applicant: Fanuc Corporation, Yamanashi (JP)

(72) Inventor: Tadanori Suzuki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 222 days.

(21) Appl. No.: 18/271,113

(22) PCT Filed: Jan. 19, 2022

(86) PCT No.: PCT/JP2022/001833
§ 371 (c)(1),
(2) Date: Jul. 6, 2023

(87) PCT Pub. No.: WO2022/163467
PCT Pub. Date: Aug. 4, 2022

(65) Prior Publication Data
US 2024/0051172 A1    Feb. 15, 2024

(30) Foreign Application Priority Data
Jan. 26, 2021  (JP) .................................. 2021-010601

(51) Int. Cl.
*B26D 5/00* (2006.01)
*B25J 11/00* (2006.01)
*B26D 3/08* (2006.01)

(52) U.S. Cl.
CPC .............. *B26D 5/005* (2013.01); *B25J 11/005* (2013.01); *B26D 3/08* (2013.01)

(58) Field of Classification Search
CPC .......... B26D 5/005; B26D 3/08; B23D 79/02; B23D 79/10; B08B 1/00; B08B 1/165;
(Continued)

(56) References Cited

U.S. PATENT DOCUMENTS 2,454,777 A * 11/1948 Cronan .................... B24B 9/065
29/25.35
3,108,349 A * 10/1963 Takacs ..................... B26D 1/00
83/578
(Continued)

FOREIGN PATENT DOCUMENTS

CN    109483239 A    3/2019
CN    111727103 A    9/2020
(Continued)

OTHER PUBLICATIONS

Office Action (Decision to Grant a Patent) issued Aug. 27, 2024, by the Japan Patent Office in corresponding Japanese Patent Application No. 2022-578286 and an English translation of the Office Action. (5 pages).

(Continued)

*Primary Examiner* — Ghassem Alie
(74) *Attorney, Agent, or Firm* — Buchanan Ingersoll & Rooney PC

(57) ABSTRACT

A robot includes a base part; a pair of scrapers provided to the base part so as to face each other, the pair of scrapers each having a proximal end connected to the base part and a distal end for cutting a surface, and the pair of scrapers extending so as to approach or recede from each other progressively from the proximal end toward the distal end; and a movement mechanism unit for rotating the base part between a first orientation in which one of the pair of scrapers is closer to a workpiece than the other scraper, and a second orientation in which the other scraper is closer to the workpiece than the one scraper.

9 Claims, 28 Drawing Sheets

(58) Field of Classification Search
CPC .... B25J 11/005; B25J 15/0052; B25J 13/085; B25J 9/1671; B25J 9/1697
USPC .................................................. 83/880, 582
See application file for complete search history.

(56) References Cited

U.S. PATENT DOCUMENTS

| | | | |
|---|---|---|---|
| 4,998,852 A | | 3/1991 | Babel et al. |
| 5,249,491 A | * | 10/1993 | Carter ................... B27B 29/00 83/365 |
| 5,915,370 A | * | 6/1999 | Casper ................... B28D 5/029 83/578 |
| 7,309,204 B2 | * | 12/2007 | Dorner ................... B25J 9/047 901/29 |
| 2002/0184982 A1 | * | 12/2002 | Smith ................. B23D 59/001 83/485 |
| 2004/0007106 A1 | | 1/2004 | Kuwahara et al. |
| 2009/0159156 A1 | | 6/2009 | Walker |
| 2010/0269650 A1 | * | 10/2010 | Hojo ................... B28D 5/0064 83/13 |
| 2014/0342125 A1 | | 11/2014 | Rees et al. |
| 2016/0214143 A1 | | 7/2016 | Nagatsuka |
| 2018/0250843 A1 | | 9/2018 | Voice et al. |
| 2020/0398392 A1 | | 12/2020 | Tilmann |

FOREIGN PATENT DOCUMENTS

| | | | | |
|---|---|---|---|---|
| JP | 02212064 A | | 8/1990 | |
| JP | 05123921 A | | 5/1993 | |
| JP | H06-063817 A | | 3/1994 | |
| JP | H07-136843 A | | 5/1995 | |
| JP | H10-151522 A | | 6/1998 | |
| JP | 2004042164 A | | 2/2004 | |
| JP | 2010240809 A | | 10/2010 | |
| JP | 2016137551 A | | 8/2016 | |
| JP | 2017131974 A | | 8/2017 | |
| WO | WO-2016104700 A1 | * | 6/2016 | ........... B23B 39/161 |

OTHER PUBLICATIONS

International Search Report and Written Opinion for International Application No. PCT/JP2022/001833, dated Apr. 5, 2022, 6 pages.

* cited by examiner

ROBOT FOR PERFORMING SCRAPING, ROBOT SYSTEM, METHOD, AND COMPUTER PROGRAM

CROSS REFERENCE TO RELATED APPLICATIONS

This is the U.S. National Phase application of PCT/JP2022/001833, filed Jan. 19, 2022, which claims priority to Japanese Patent Application No. 2021-010601, filed Jan. 26, 2021, the disclosures of each of these applications being incorporated herein by reference in their entireties for all purposes.

FIELD OF THE INVENTION

The present disclosure relates to a robot, a robot system, a method, and a computer program for performing a scraping process.

BACKGROUND OF THE INVENTION

There is a known robot that performs a scraping process (e.g., Patent Document 1).

Patent Literature

Patent Document 1: JP 2004-042164 A

SUMMARY OF THE INVENTION

In the case of forming a plurality of recesses through the scraping process with the robot, a reduction of a cycle time of the scraping process is desired.

In one aspect of the present disclosure, a robot that performs a scraping process to scrape and smoothen a surface of a workpiece includes a base; a pair of scrapers disposed at the base so as to be opposite each other, each having a proximal end connected to the base and a distal end that scrapes the surface, the pair of scrapers extending so as to approach or separate from each other as extending from the proximal ends toward the distal ends; and a moving mechanism that rotates the base between a first orientation in which one of the pair of scrapers is closer to the surface than the other of the pair of scrapers; and a second orientation in which the other of the pair of scrapers is closer to the surface than the one of the pair of scrapers.

In another aspect of the present disclosure, a method of performing a scraping process to scrape and smoothen a surface of a workpiece, using the above-described robot. The method includes executing, by a processor, a first scraping process by pressing the distal end of the one of the pair of scrapers against the surface and moving the base in a first direction, while arranging the base at the first orientation; rotating, by the processor, the base from the first orientation to the second orientation, after the first scraping process; and executing, by the processor, a second scraping process by pressing the distal end of the other of the pair of scrapers against the surface and moving the base in a second direction opposite to the first direction, while arranging the base at the second orientation.

According to the present disclosure, the scrapers can be switched by rotating the base between the first orientation and the second orientation, thus making it possible to form a recess with the one of the scrapers and a next recess with the other of the scrapers. This makes it possible to shorten a time from the end of the first scraping process to form one recess to the start of the second scraping process to form a next recess, and thus a plurality of recesses can be consecutively and efficiently formed in the surface. Accordingly, the cycle time of the scraping process can be reduced, and thus the productivity can be improved.

DETAILED DESCRIPTION OF EMBODIMENTS OF THE INVENTION

Figure 1:
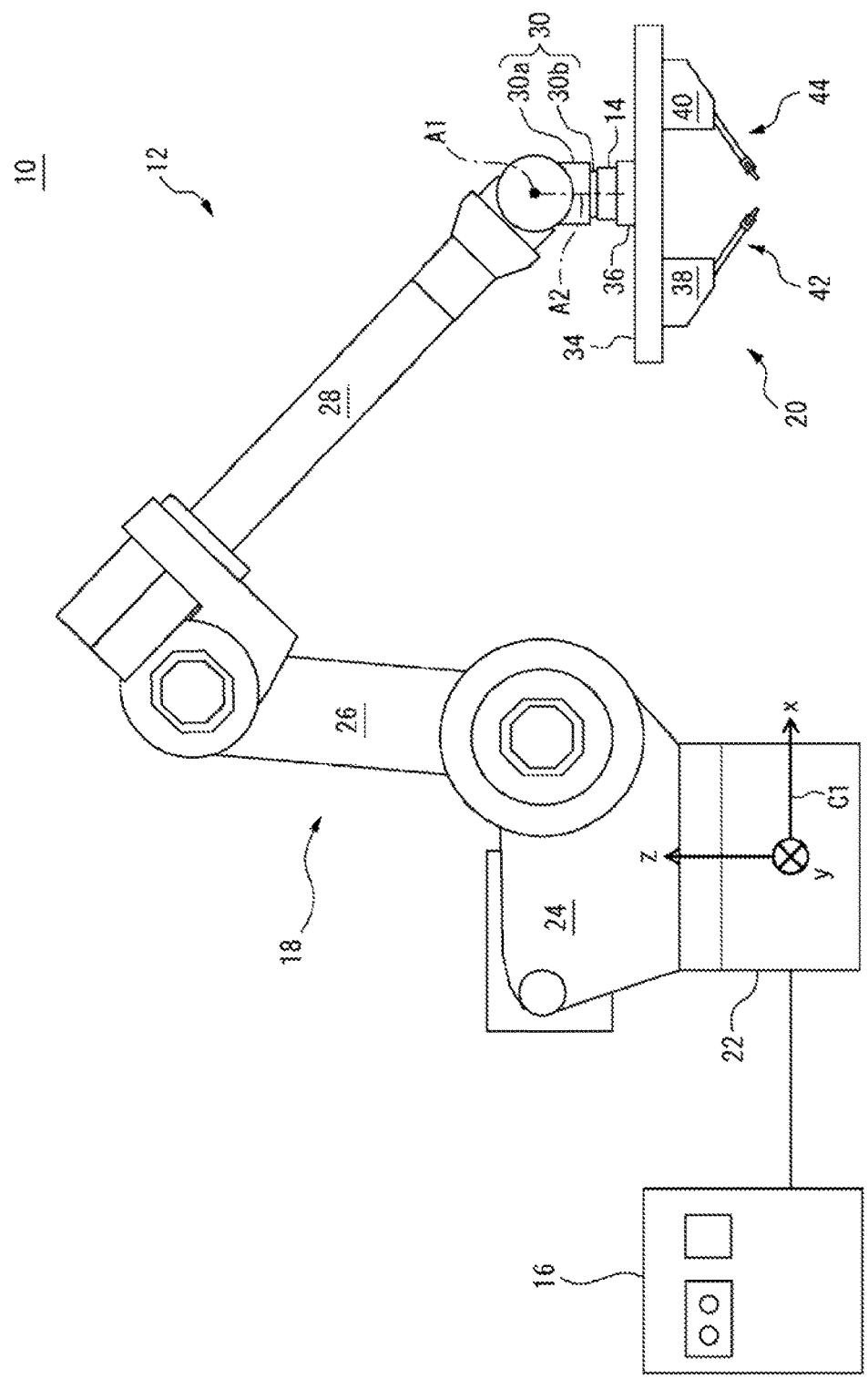
FIG. 1 is a diagram of a robot system according to an embodiment.

Hereinafter, embodiments of the present disclosure will be described in detail with reference to the drawings. In various embodiments described below, the same elements are designated by the same reference numerals and duplicate description will be omitted. In the following description, a positive x-axis direction of a robot coordinate system C1 illustrated in the drawings may be referred to as rightward, a positive y-axis direction may be referred to as frontward, and a positive z-axis direction may be referred to as upward.

A robot system 10 according to an embodiment will first be described with reference to FIG. 1 to FIG. 3. The robot system 10 is a system that performs a scraping process to scrape and smoothen a surface Q of a workpiece W. The scraping process is a process to scrape the surface Q of a workpiece W such that the dimensions of fine unevenness formed in the surface Q in a thickness direction of the workpiece W fall within a predetermined range (e.g., on the order of μm).

The fine unevenness functions as a so-called "oil retainer" for storing lubricating oil in the surface Q to be used as a sliding surface. For example, the scraping process includes rough machining through which fine unevenness formed when a surface of a workpiece is machined by a milling machine or the like is made to be of a first dimension (e.g., 10 μm) or less, and finish machining through which the fine unevenness is made to be of a second dimension (e.g., 5 μm) or less, the second dimension being smaller than the first dimension after the rough machining.

The robot system 10 includes a robot 12, a force sensor 14, and a control device 16. In the present embodiment, the robot 12 is a vertical articulated robot and includes a moving mechanism 18 and an end effector 20. The moving mechanism 18 includes a robot base 22, a turning body 24, a lower arm 26, an upper arm 28, and a wrist 30. The robot base 22 is fixed on a floor of a work cell. The turning body 24 is disposed at the robot base 22 so as to be turnable about a vertical axis.

The lower arm 26 is disposed at the turning body 24 so as to be rotatable about a horizontal axis, and the upper arm 28 is rotatably disposed at a distal end of the lower arm 26. The wrist 30 includes a wrist base 30a disposed at a distal end of the upper arm 28 so as to be rotatable about an axis A1, and a wrist flange 30b disposed at the wrist base 30a so as to be rotatable about an axis A2. The axis A2 is orthogonal to the axis A1 and rotates about the axis A1.

A servo motor 32 (FIG. 2) is provided at each constituent element (the robot base 22, the turning body 24, the lower arm 26, the upper arm 28, and the wrist 30) of the moving mechanism 18. The servo motors 32 cause each respective movable element (the turning body 24, the lower arm 26, the upper arm 28, the wrist 30, and the wrist flange 30b) of the moving mechanism 18 to rotate about each respective drive shaft thereof in response to a command from the control device 16. As a result, the moving mechanism 18 can move and arrange the end effector 20 at any position and any orientation.

The end effector 20 is removably attached to the wrist flange 30b via the force sensor 14. Hereinafter, a configuration of the end effector 20 will be described with reference to FIG. 3. The end effector 20 includes a base 34, a mounting flange 36, a pair of scraper holders 38 and 40, and a pair of scrapers 42 and 44.

The base 34 is a rod-like member extending straight along an axis A3. The axis A3 is orthogonal to the axis A2 and rotates about the axis A2. The mounting flange 36 is a cylindrical member centered on the axis A2 and is fixed to a central part of a top surface 34a of the base 34. In the present embodiment, the mounting flange 36 is fixed to a distal end of the force sensor 14 using, for example, a fastener (a bolt or the like). The pair of scraper holders 38 and 40 are fixed to a bottom surface 34b of the base 34 so as to be spaced apart from each other in the axis A3 direction.

The pair of scrapers 42 and 44 are disposed at the base 34 so as to be opposite each other in the axis A3 direction. In the present embodiment, the pair of scrapers 42 and 44 are arranged symmetrically with respect to the axis A2. More specifically, the scraper 42 includes a handle 46 and a blade 48. The handle 46 is a flexible member extending substantially linearly along an axis A4 from a proximal end 46a to a distal end 46b of the handle 46 and is fixed to the scraper holder 38 at the proximal end 46a using, for example, a fastener (bolt or the like).

Figure 4:
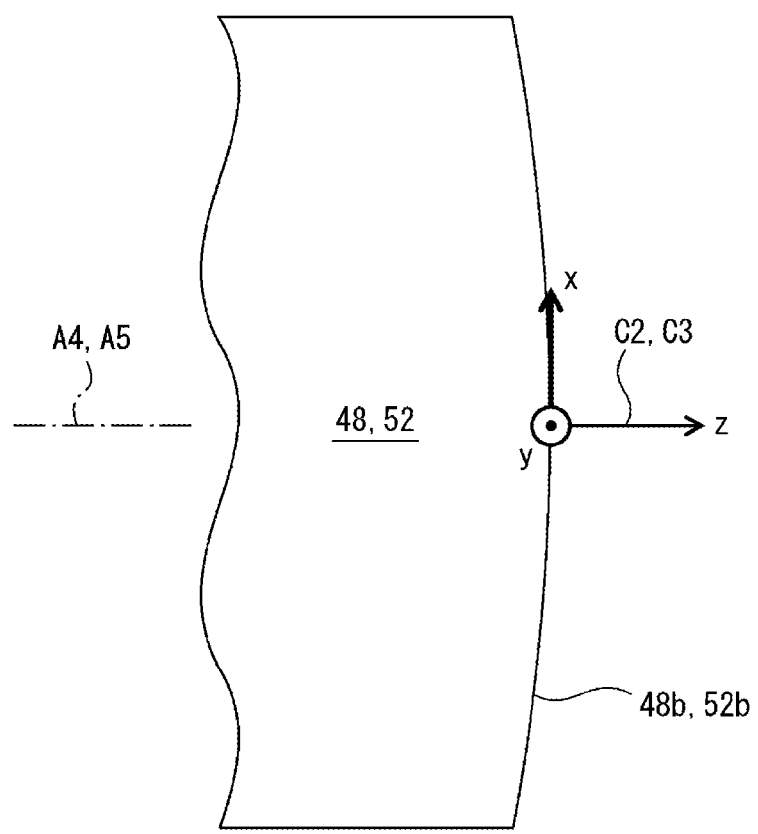
FIG. 4 is an enlarged view of a blade of a scraper illustrated in FIG. 3 as viewed from above.

The blade 48 is an iron member extending along the axis A4 from a proximal end 48a to a distal end 48b of the blade 48, and the proximal end 48a is fixed to the distal end 46b of the handle 46. As illustrated in FIG. 4, when viewed from above, the distal end 48b of the blade 48 is curved so as to bulge outward from both ends along a width of the distal end 48b with proximity to a center of the blade 48. The blade 48 scrapes the surface Q of the workpiece W with the distal end 48b.

The proximal end 46a of the handle 46 defines a proximal end of the scraper 42, and the distal end 48b of the blade 48 defines a distal end of the scraper 42. The proximal end 46a of the scraper 42 is connected to the base 34 via the scraper holder 38, and the scraper 42 is thereby supported by the base 34. In the present embodiment, the axis A4 is inclined at an angle θ1 with respect to the axis A3, and the scraper 42 extends closer to the scraper 44 from the proximal end 46a toward the distal end 48b.

The scraper 44 has the same configuration as the scraper 42. Specifically, the scraper 44 includes a handle 50 and a blade 52. The handle 50 is a flexible member extending substantially linearly along an axis A5 from a proximal end 50a to a distal end 50b of the handle 50 and is fixed to the scraper holder 40 at the proximal end 50a.

The blade 52 extends along the axis A5 from a proximal end 52a to a distal end 52b of the blade 52, and the proximal end 52a is fixed to the distal end 50b of the handle 50. As illustrated in FIG. 4, similarly to the blade 48, the distal end 52b of the blade 52 is curved so as to bulge outward from both ends along a width of the distal end 52b with proximity to a center of the blade 52. The blade 52 scrapes the surface Q of the workpiece W with the distal end 52b.

The proximal end 50a of the handle 50 defines a proximal end of the scraper 44, and the distal end 52b of the blade 52 defines a distal end of the scraper 44. The proximal end 50a of the scraper 44 is connected to the base 34 via the scraper holder 40, and the scraper 44 is thereby supported by the base 34.

In the present embodiment, the axis A5 is inclined at an angle θ2 with respect to the axis A3, and the scraper 44 extends closer to the scraper 42 from the proximal end 50a toward the distal end 52b. Note that the inclination angle θ1 of the axis A4 of the scraper 42 with respect to the axis A3 and the inclination angle θ2 of the axis A5 of the scraper 44 with respect to the axis A3 are substantially equal to each other (θ1=θ2).

As described above, the pair of scrapers 42 and 44 are arranged so as to be opposite each other in the axis A3 direction, and extend so as to approach each other as extending from the proximal ends 46a and 50a toward the distal ends 48b and 52b. The distal end 48b of the scraper 42 and the distal end 52b of the scraper 44 are spaced apart from each other by a spacing δ in the axis A3 direction.

The force sensor 14 detects a pressing force F at which the moving mechanism 18 presses the scraper 42 or 44 against the surface Q of the workpiece W. For example, the force sensor 14 is a six-axis force sensor including a body having a cylindrical shape and a plurality of strain gauges disposed at the body (both not illustrated), and is interposed between the wrist flange 30b and the end effector 20. In the present embodiment, the force sensor 14 is arranged such that a central axis of the force sensor 14 coincides with the axis A2 (i.e., arranged concentrically with the wrist flange 30b and the mounting flange 36).

The control device 16 controls an operation of the robot 12. As illustrated in FIG. 2, the control device 16 is a computer including a processor 60, a memory 62, an I/O interface 64, an input device 66, and a display device 68. The processor 60 is communicably connected to the memory 62, the I/O interface 64, the input device 66, and the display device 68 via a bus 70, and performs arithmetic processing to execute the scraping process while communicating with these components.

The memory 62 includes a RAM, a ROM, or the like, and temporarily or permanently stores various types of data used in the arithmetic processing and various types of data generated during the arithmetic processing executed by the processor 60. The I/O interface 64 includes, for example, an Ethernet (trade name) port, a USB port, an optical fiber connector, or an HDMI (trade name) terminal, and performs wired or wireless data communication with an external device in accordance with a command from the processor 60. In the present embodiment, each of the servo motors 32 of the moving mechanism 18 and the force sensor 14 are communicably connected to the I/O interface 64.

The input device 66 includes a keyboard, a mouse, a touch panel, or the like, so as to enable an operator to input data. The display device 68 includes a liquid crystal display, an organic EL display, or the like, and displays various types of data in a visually recognizable manner in accordance with a command from the processor 60. The input device 66 or the display device 68 may be integrally embedded in a housing of the control device 16, or may be externally mounted at the housing of the control device 16 as a component separate from the housing.

Figure 2:
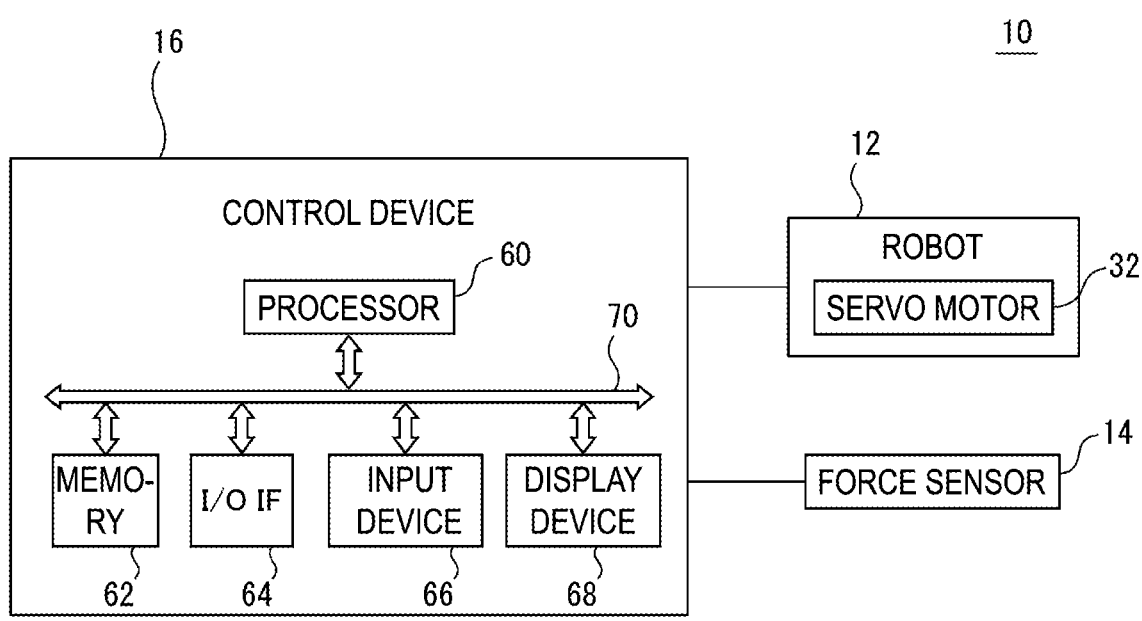
FIG. 2 is a block diagram of the robot system illustrated in FIG. 1.

As illustrated in FIG. 1, the robot coordinate system C1 is set for the robot 12. The robot coordinate system C1 is a coordinate system for controlling an operation of each movable element of the moving mechanism 18 and is fixed with respect to the robot base 22. In the present embodiment, the robot coordinate system C1 is set with respect to the moving mechanism 18 such that the origin of the robot coordinate system C1 is arranged at a center of the robot base 22 and the z-axis of the robot coordinate system C1 coincides with a turning axis of the turning body 24.

Figure 3:
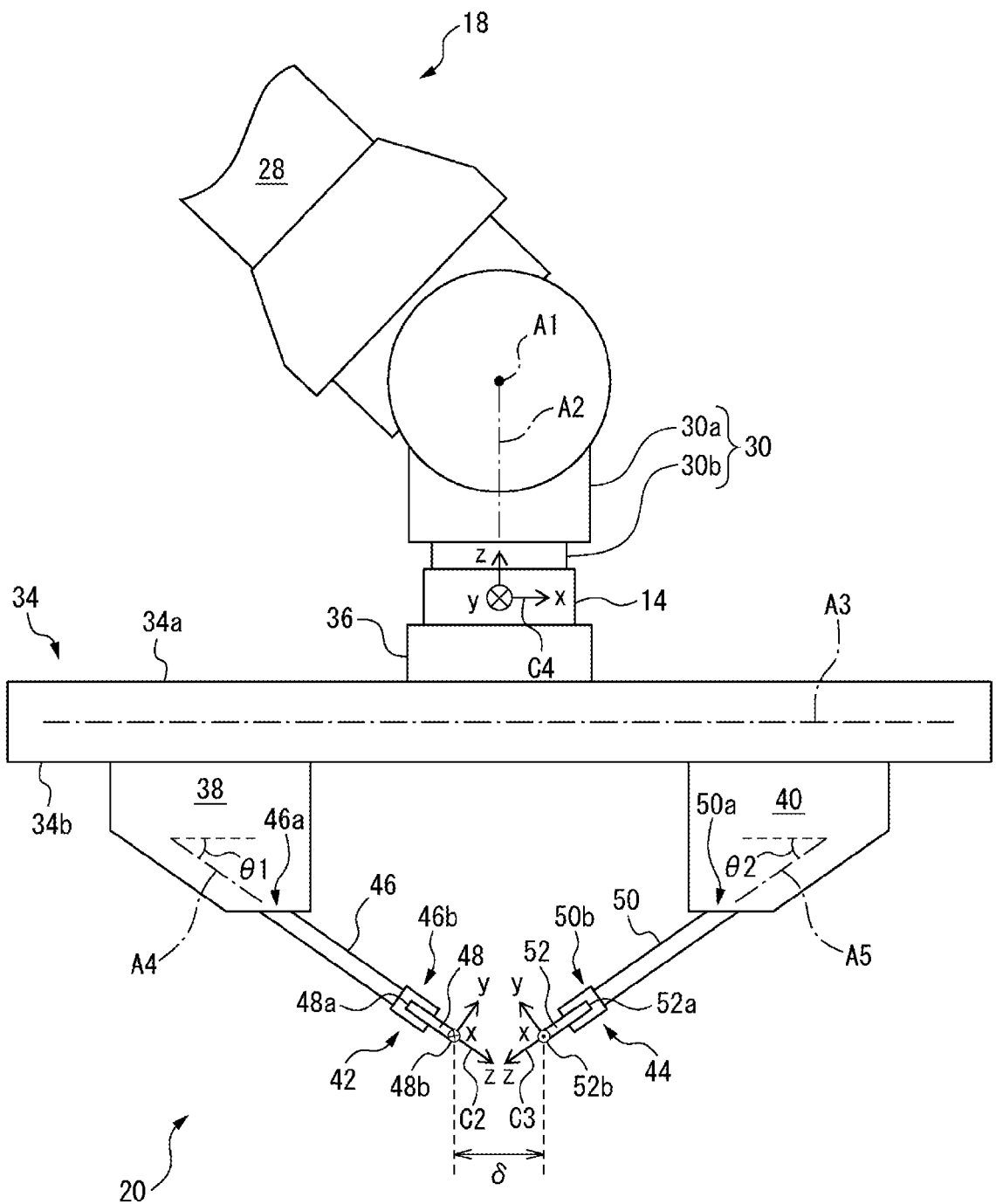
FIG. 3 is an enlarged view of an end effector illustrated in FIG. 1.

As illustrated in FIG. 3, a tool coordinate system C2 is set for the scraper 42. The tool coordinate system C2 is a coordinate system for defining a position and an orientation of the scraper 42 in the robot coordinate system C1 and is arranged at a known position with respect to the wrist flange 30b. In the present embodiment, the tool coordinate system C2 is set with respect to the scraper 42 such that the origin of the tool coordinate system C2 (a so-called TCP) is arranged at a center of the distal end 48b of the blade 48 in a state in which the handle 46 is not bent and the z-axis of the tool coordinate system C2 is parallel to the axis A4 (or a normal direction of the curved surface of the distal end 48b at the center of the distal end 48b).

When moving the scraper 42, the processor 60 of the control device 16 sets the tool coordinate system C2 in the robot coordinate system C1, and generates a command (a position command, a speed command, a torque command, or the like) for each of the servo motors 32 of the moving mechanism 18 to arrange the scraper 42 at a position and an orientation expressed through the set tool coordinate system C2. In this way, the processor 60 can position the scraper 42 at a position and an orientation of choice in the robot coordinate system C1.

On the other hand, a tool coordinate system C3 is set for the scraper 44. The tool coordinate system C3 is a coordinate system for defining a position and an orientation of the scraper 44 in the robot coordinate system C1 and is arranged at a known position with respect to the wrist flange 30b. The tool coordinate system C3 is set with respect to the scraper 44 such that the origin of the tool coordinate system C3 (TCP) is arranged at a center of the distal end 52b of the blade 52 in a state in which the handle 50 is not bent and the z-axis of the tool coordinate system C3 is parallel to the axis A5.

When moving the scraper 44, the processor 60 sets the tool coordinate system C3 in the robot coordinate system C1, and generates a command for each of the servo motors 32 of the moving mechanism 18 to arrange the scraper 44 at a position and an orientation expressed through the set tool coordinate system C3. In this way, the processor 60 can position the scraper 44 at a position and an orientation of choice in the robot coordinate system C1.

A sensor coordinate system C4 is set for the force sensor 14. The sensor coordinate system C4 is a coordinate system for defining a direction of a force acting on the force sensor 14. In the present embodiment, the sensor coordinate system C4 is set with respect to the force sensor 14 such that the origin of the sensor coordinate system C4 is arranged at a center of the force sensor 14 and the z-axis of the sensor coordinate system C4 coincides with the axis A2.

Figure 5:
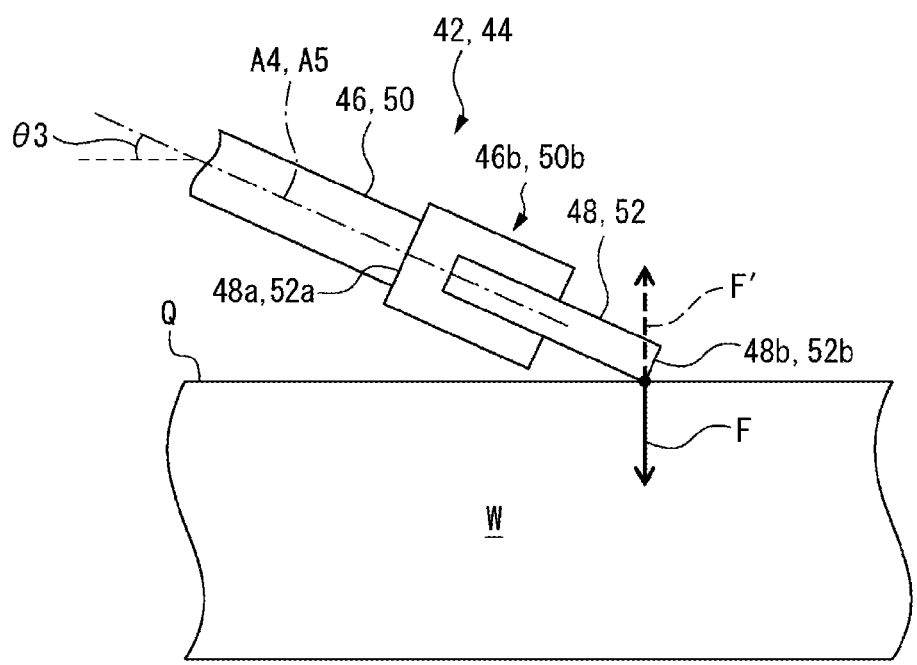
FIG. 5 illustrates a state in which the scraper is pressed against a surface of a workpiece.

FIG. 5 illustrates a state in which the moving mechanism 18 presses the distal end 48b (or 52b) of the scraper 42 (or 44) against the surface Q of the workpiece W. When the moving mechanism 18 presses the distal end 48b (52b) of the scraper 42 (44) against the surface Q at the pressing force F in a direction orthogonal to the surface Q, a reaction force F' of the pressing force F is applied from the surface Q to the force sensor 14 via the scraper 42 (44).

Each of the strain gauges of the force sensor 14 transmits detection data corresponding to the force acting on the force sensor 14 to the control device 16 at this time. Based on the detection data received from the force sensor 14 via the I/O interface 64, the processor 60 obtains forces f in the x-axis direction, the y-axis direction, and the z-axis direction of the sensor coordinate system C4 and torques τ around the x-axis direction, the y-axis direction, and the z-axis direction that act on the force sensor 14 at this time. The processor 60 calculates a magnitude of the reaction force F' acting on the distal end 48b (52b) in the direction orthogonal to the surface Q, based on the forces f, the torques τ, and condition data CD of the scraper 42 (44) at this time.

The condition data CD includes, for example, at least one of an angle θ3 between the axis A4 (axis A5) and the surface Q, a distance d1 between the axis A2 (or the origin of the sensor coordinate system C4) and the distal end 48b (52b) of the scraper 42 (44), a distance d2 between the axis A2 and the proximal end 46a (50a) of the scraper 42 (44), a distance d3 between the proximal end 46a (50a) and the distal end 48b (52b) of the scraper 42 (44), position data indicating a position and an orientation of the tool coordinate system C2 (C3) in the robot coordinate system C1, or bend data of the handle 46 (50) (e.g., a bend amount or an elastic modulus). In this way, the force sensor 14 detects the reaction force F' as the pressing force F, and the control device 16 can determine the magnitude of the pressing force F (the reaction force F') based on the detection data of the force sensor 14.

Figure 6:
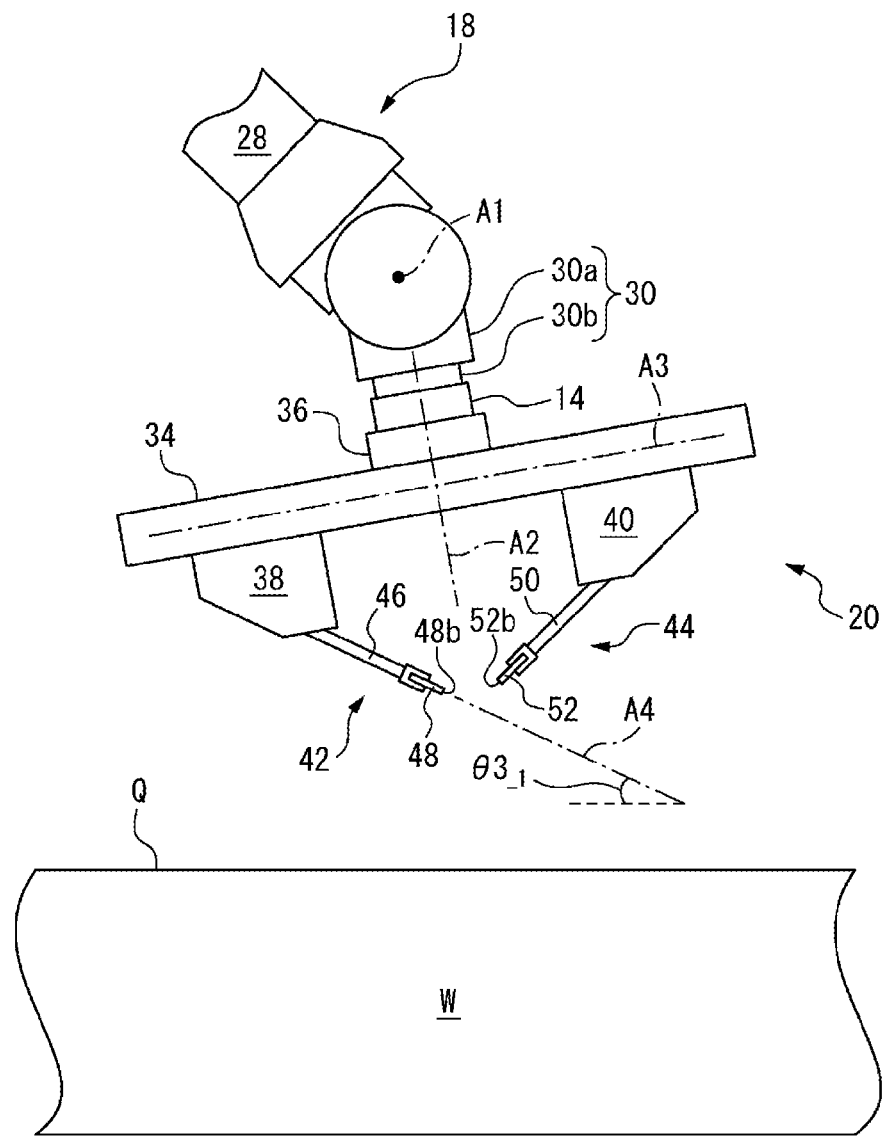
FIG. 6 illustrates a state in which a base is arranged at a first orientation.

The scraping process executed by the robot 12 will be described next. Note that the workpiece W may be placed at a known position in the robot coordinate system C1 such that a left end edge B1 (FIG. 10) of the workpiece W is closer to the moving mechanism 18 (to be specific, the robot base 22) than a right end edge B2. The processor 60 first operates the moving mechanism 18 to arrange the base 34 (i.e., the end effector 20) at a first orientation OR1. FIG. 6 illustrates a state in which the base 34 is arranged at the first orientation OR1.

When the base 34 is arranged at the first orientation OR1, the distal end 48b of the scraper 42 is closer to the surface Q of the workpiece W than the distal end 52b of the scraper 44. The axis A3 of the base 34 is arranged substantially parallel to an x-z plane of the robot coordinate system C1, the axis A4 of the scraper 42 is inclined at an angle $θ3_{-1}$ with respect to the surface Q, and the axes A1, A2, and A3 are substantially orthogonal to each other.

Figure 7:
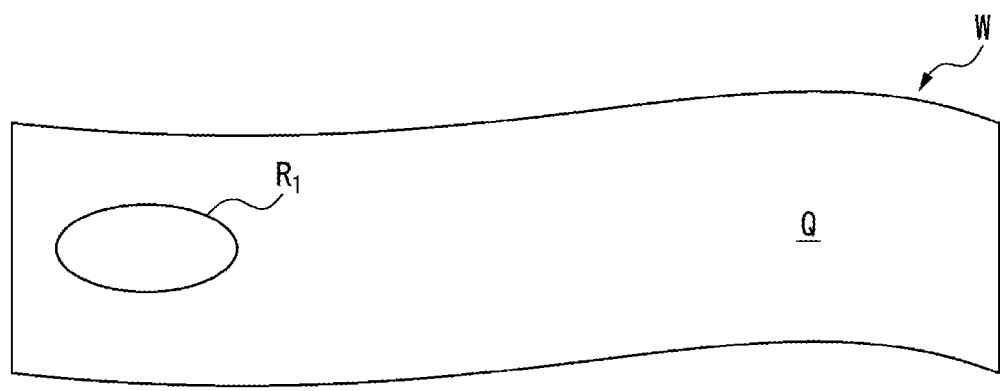
FIG. 7 illustrates a first recess formed in the surface of the workpiece by one of the scrapers.
Figure 7:
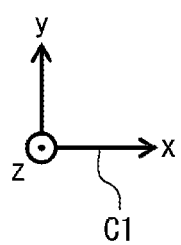

Next, in the state in which the base 34 is arranged at the first orientation OR1, the processor 60 presses the distal end 48b of the scraper 42 against the surface Q, moves the base 34 (end effector 20) rightward, and subsequently separates the distal end 48b from the surface Q. As a result, a recess $R_1$ is formed in the surface Q as illustrated in FIG. 7. The recess $R_1$ has a depth on the order of μm and functions as the above-described "oil retainer". In this manner, a first scraping process $SC_1$ of forming the recess $R_1$ with the scraper 42 is performed.

Figure 8:
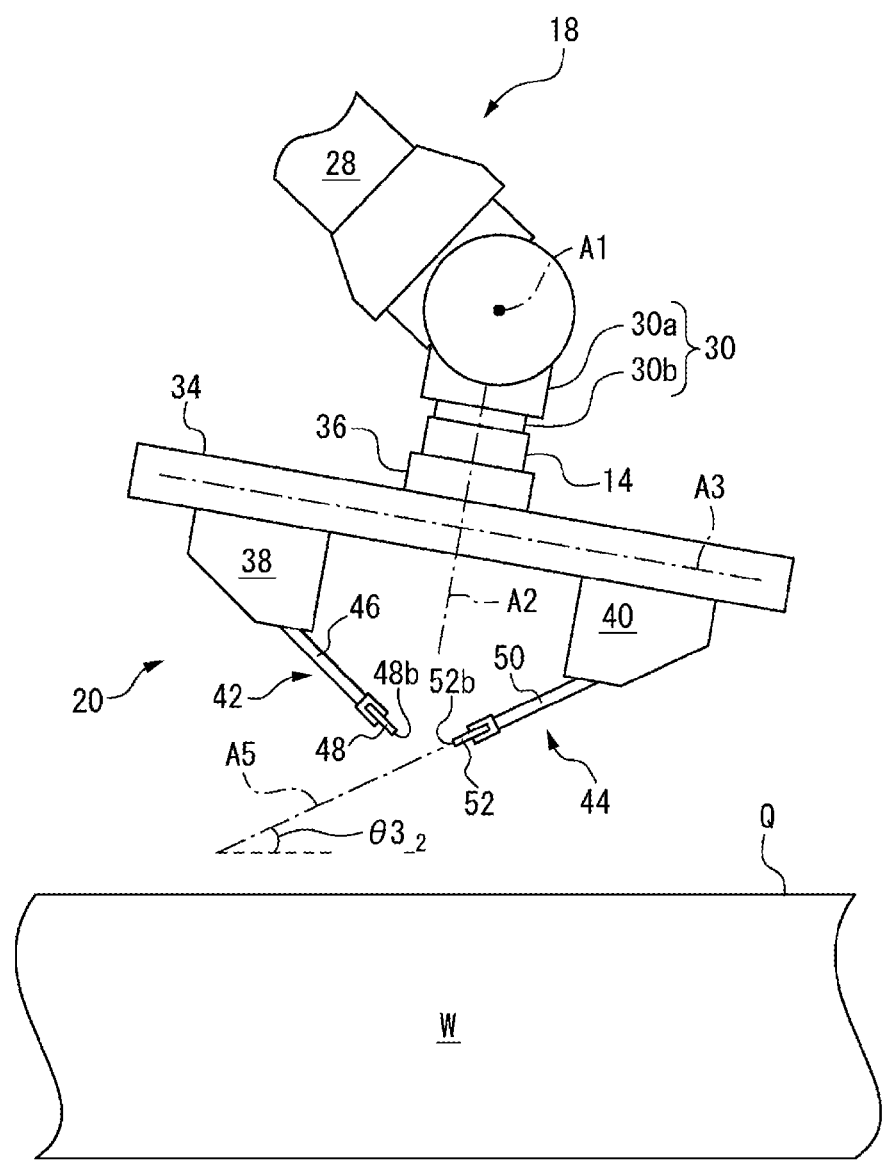
FIG. 8 illustrates a state in which the base is arranged at a second orientation.
Figure 8:
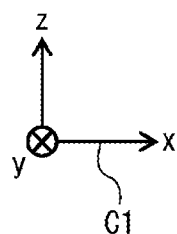

After the first scraping process $SC_1$, the processor 60 operates the moving mechanism 18 to rotate the base 34 (end effector 20) from the first orientation OR1 illustrated in FIG. 6 to a second orientation OR2 illustrated in FIG. 8. When the base 34 is arranged at the second orientation OR2, the distal end 52b of the scraper 44 is closer to the surface Q than the distal end 48b of the scraper 42. The axis A3 of the base 34 is arranged substantially parallel to the x-z plane of the robot coordinate system C1, the axis A5 of the scraper 44 is inclined at an angle $θ3_{-2}$ with respect to the surface Q, and the axes A1, A2, and A3 are substantially orthogonal to each other.

Figure 9:
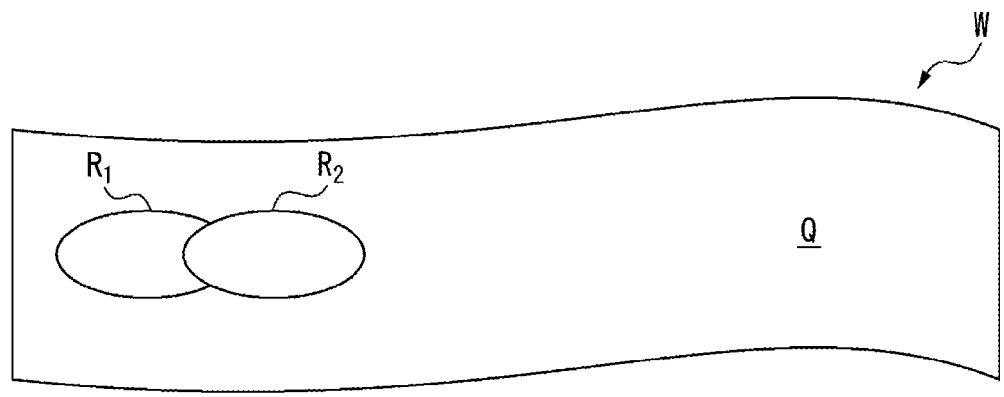
FIG. 9 illustrates a second recess formed in the surface of the workpiece by the other of the scrapers.
Figure 9:
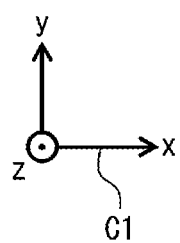

Next, in a state in which the base 34 is arranged at the second orientation OR2, the processor 60 presses the distal end 52b of the scraper 44 against the surface Q at a position rightward from the recess $R_1$, moves the base 34 (end effector 20) leftward, and subsequently separates the distal end 52b from the surface Q. As a result, a recess $R_2$ is formed adjacent to a right side of the recess $R_1$ in the surface Q as illustrated in FIG. 9. Similar to the recess $R_1$, the recess $R_2$ has a depth on the order of μm. In this manner, a second scraping process $SC_2$ of forming the recess $R_2$ with the scraper 44 is performed.

Figure 10:
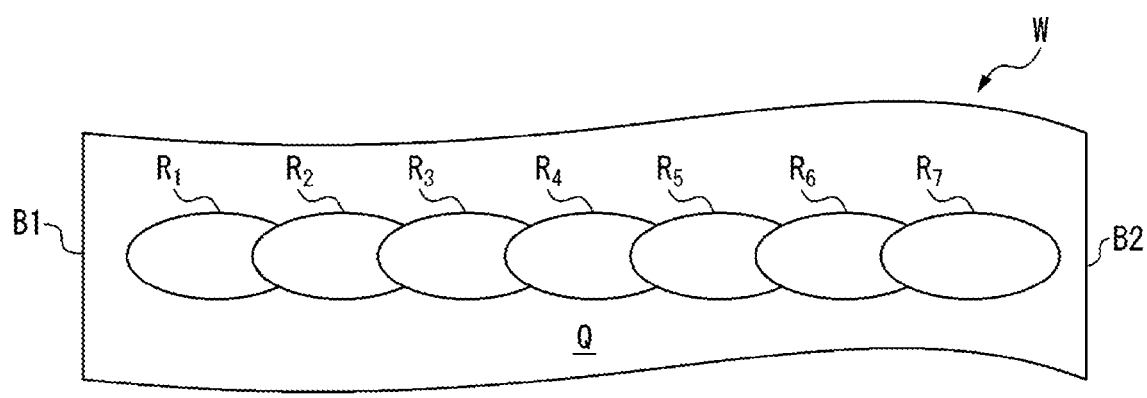
FIG. 10 illustrates a plurality of recesses formed side by side in the surface of the workpiece.
Figure 10:
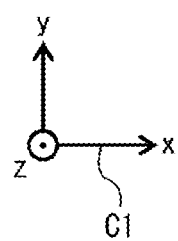

Subsequently, the processor 60 repeats a series of operations to rotate the base 34 from the second orientation OR2 to the first orientation OR1, form a recess $R_{2\ m-1}$ (m is a positive integer) by pressing the distal end 48b of the scraper 42 against the surface Q and moving the base 34 rightward, rotate the base 34 from the first orientation OR1 to the second orientation OR2, and form a recess $R_{2\ m}$ by pressing the distal end 52b of the scraper 44 against the surface Q and moving the base 34 leftward. As a result, a plurality of recesses $R_1$ to $R_7$ arranged side by side in the x-axis direction of the robot coordinate system C1 can be formed in the surface Q from a position near the left end edge B1 to a position near the right end edge B2 of the surface Q, as illustrated in FIG. 10.

Figure 11:
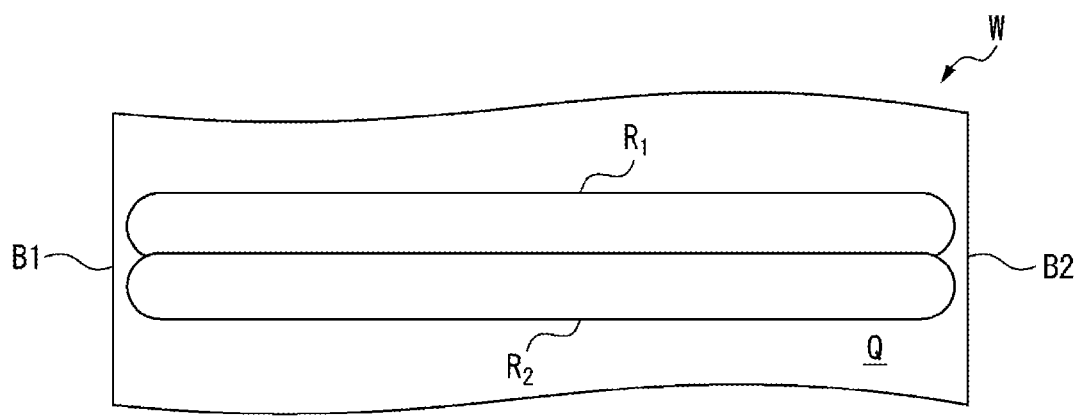
FIG. 11 is a diagram for illustrating another example of the scraping process and illustrates recesses formed so as to extend from one end edge to the other end edge of the surface of the workpiece.
Figure 11:
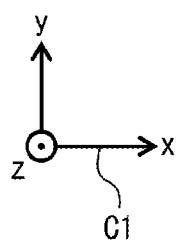

FIG. 11 illustrates another example of the scraping process. In the example illustrated in FIG. 11, in the state in which the base 34 is arranged at the first orientation OR1, the processor 60 presses the distal end 48b of the scraper 42 against the surface Q at a position near the left end edge B1, moves the base 34 rightward to a position near the right end edge B2, and subsequently separates the distal end 48b from the surface Q. As a result, a recess $R_1$ extending from the position near the left end edge B1 to the position near the right end edge B2 is formed in the surface Q as illustrated in FIG. 11. In this manner, a first scraping process $SC_1$ of forming the recess $R_1$ with the scraper 42 is performed.

After the first scraping process $SC_1$, the processor 60 rotates the base 34 from the first orientation OR1 to the second orientation OR2, presses the distal end 52b of the scraper 44 against the surface Q at a position at a rear side of the right end of the recess $R_1$, moves the base 34 leftward from a position near the right end edge B2 to a position near the left end edge B1, and subsequently separates the distal end 52b from the surface Q. In this manner, a second scraping process $SC_2$ of forming a recess $R_2$ with the scraper 44 is performed. As a result, the recess $R_2$ extending from the position near the right end edge B2 to the position near the left end edge B1 is formed adjacent to a rear side of the recess $R_1$ in the surface Q.

Subsequently, the processor 60 repeats a series of operations to rotate the base 34 from the second orientation OR2 to the first orientation OR1, form a recess $R_{2\ m-1}$ by pressing the distal end 48b of the scraper 42 against the surface Q and moving the base 34 rightward, rotate the base 34 from the first orientation OR1 to the second orientation OR2, and form a recess $R_{2\ m}$ by pressing the distal end 52b of the scraper 44 against the surface Q and moving the base 34 leftward. Accordingly, a plurality of recesses $R_1$, $R_2$, . . . can be formed in the surface Q extending from the left end edge B1 to the right end edge B2 of the surface Q and arranged side by side in the y-axis direction of the robot coordinate system C1.

As described above, in the examples illustrated in FIG. 10 and FIG. 11, the processor 60 forms the recess $R_{2\ m-1}$ by pressing the scraper 42 against the surface Q and moving the scraper 42 rightward in a (2 m-1)th scraping process $SC_{2\ m-1}$, and forms the recess $R_{2\ m}$ by pressing the scraper 44 against the surface Q and moving the scraper 44 leftward in the 2m-th scraping process $SC_{2m}$.

In this manner, the processor 60 alternately switches the scrapers 42 and 44 by rotating the base 34 between the first orientation OR1 and the second orientation OR2 to form the recess $R_{2\ m-1}$ with the scraper 42 and the recess $R_{2\ m}$ with the scraper 44. For example, the processor 60 may rotate the base 34 between the first orientation OR1 and the second orientation OR2 by operating the servo motor 32 rotating the wrist 30 with respect to the upper arm 28 in order to rotate the wrist 30 about the axis A1.

Figure 12:
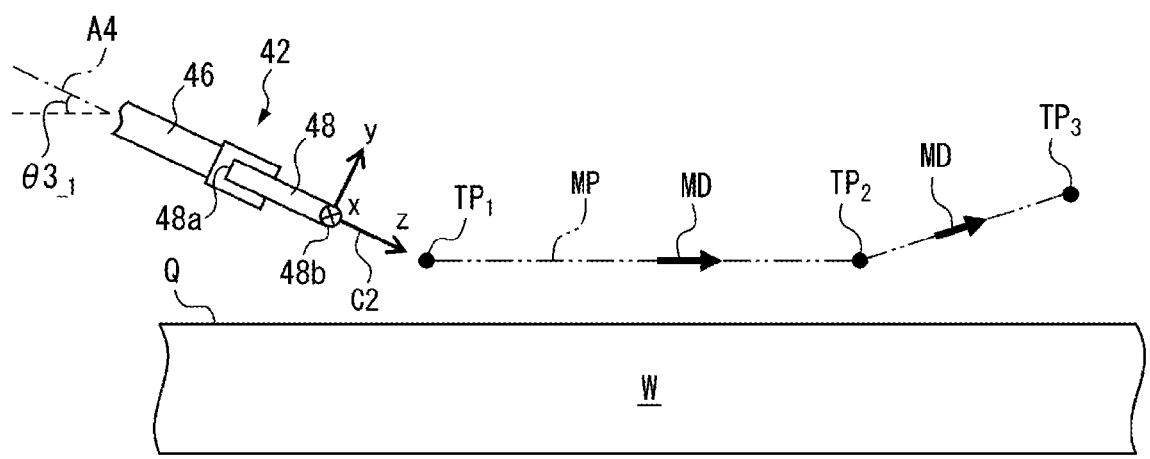
FIG. 12 illustrates an example of teaching points set with respect to the surface of the workpiece for forming a recess by the one of the scrapers.
Figure 12:
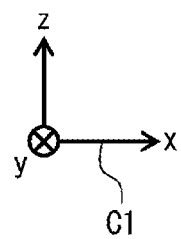

Controls of the robot 12 in the scraping process will be described next in more detail with reference to FIG. 12 to FIG. 18. In order to form one recess R, a plurality of teaching points $TP_n$ are set with respect to the surface Q. FIG. 12 illustrates three teaching points $TP_n$ (n=1, 2, 3) set to form the above-described recess $R_{2\ m-1}$. Note that the three teaching points $TP_n$ illustrated in FIG. 12 are only examples, and that any number (e.g., four or more) of teaching points $TP_n$ may be set.

These teaching points $TP_n$ define coordinates in the robot coordinate system C1 at which the distal end 48b of the scraper 42 (i.e., the origin of the tool coordinate system C2: TCP) is to be positioned so as to form the recess $R_{2\ m-1}$. When performing the (2 m−1)th scraping process $SC_{2\ m-1}$, the processor 60 arranges the base 34 at the first orientation OR1, starts a position control, and generates a position control command $PC_n$ for causing the moving mechanism 18 to move the scraper 42 to the teaching point $TP_n$.

The processor 60 arranges the scraper 42 at the teaching points $TP_1 \rightarrow TP_2 \rightarrow TP_3$ in this order by operating the respective servo motors 32 of the moving mechanism 18 in accordance with the position control command $PC_n$. Through the position control, the processor 60 causes the scraper 42 (specifically, the distal end 48b) to move along a movement path MP defined by the plurality of teaching points $TP_n$.

In the present embodiment, for ease of understanding, the surface Q of the workpiece W is substantially parallel to an x-y plane of the robot coordinate system C1, and a direction MD of the movement path MP is substantially parallel to the x-z plane of the robot coordinate system C1. The position control command $PC_n$ includes a speed command $PC_{V\_n}$ defining a speed $V_{P\_n}$ at which the scraper 42 (or the wrist flange 30b) is moved to the teaching point TN.

Figure 13:
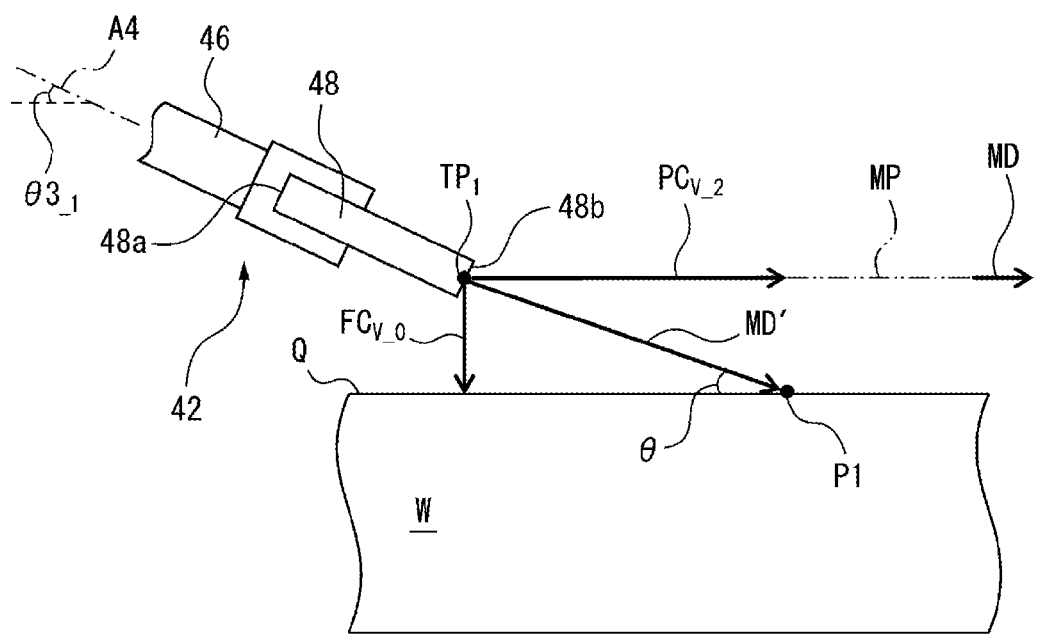
FIG. 13 is a diagram for illustrating a speed command as a position control command and a speed command as a force control command.
Figure 13:
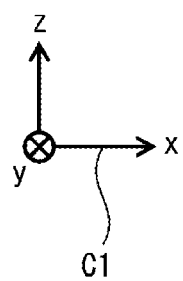

After the start of the position control, the processor 60 operates the moving mechanism 18 in accordance with a position control command $PC_1$ to move the scraper 42 to the teaching point $TP_1$. When the distal end 48b of the scraper 42 is arranged at the teaching point $TP_1$, the distal end 48b is spaced apart upward from the surface Q as illustrated in FIG. 13.

When the scraper 42 reaches the teaching point $TP_1$, the processor 60 starts a force control. After the start of the force control, the processor 60 controls a position of the wrist flange 30b of the moving mechanism 18 (or the origin of the tool coordinate system C2) based on the detection data of the force sensor 14 such that the pressing force F at which the moving mechanism 18 presses the scraper 42 against the surface Q of the workpiece W is controlled to be at a predetermined target value φ.

Specifically, in the force control, the processor 60 generates a force control command FC for controlling the position of the wrist flange 30b of the moving mechanism 18 in order to control the pressing force F (specifically, the reaction force F') obtained based on the detection data of the force sensor 14 to be at the target value φ. The processor 60 then adds the force control command FC to the position control command $PC_n$ to operate the servo motors 32 of the moving mechanism 18.

Accordingly, the processor 60 causes the scraper 42 (or the wrist flange 30b) to move in the direction MD of the movement path MP along the surface Q in accordance with the position control command $PC_n$ and causes the scraper 42 (wrist flange 30b) to move in a direction so as to approach or separate from the surface Q (i.e., the z-axis direction of the robot coordinate system C1) in accordance with the force control command FC.

The force control command FC includes a speed command $FC_V$ defining a speed at which the scraper 42 is moved in the z-axis direction of the robot coordinate system C1 in order to cause the pressing force F to reach the target value φ. In the force control, the processor 60 operates the moving mechanism 18 in accordance with the speed command $FC_V$ to move the scraper 42 (wrist flange 30b) in the z-axis direction of the robot coordinate system C1.

When the scraper 42 reaches the teaching point $TP_1$, the processor 60 generates a speed command $PC_{V\_2}$ as a position control command $PC_2$ for causing the scraper 42 to move to the teaching point $TP_2$, and generates a speed command $FC_{V\_0}$ as the force control command FC. FIG. 13 schematically illustrates the speed command $PC_{V\_2}$ and the speed command $FC_{V\_0}$ generated by the processor 60 when the scraper 42 reaches the teaching point $TP_1$.

After the scraper 42 reaches the teaching point $TP_1$, the processor 60 operates the moving mechanism 18 in accordance with the speed command $PC_{V\_2}$ to move the scraper 42 in the direction MD along the surface Q to the teaching point $TP_2$ at a speed $V_{P\_2}$ corresponding to (specifically, coincident with) the speed command $PC_{V\_2}$.

Along with this, the processor 60 generates the speed command $FC_{V\_0}$ in order to control the pressing force F to be at the target value φ and adds the generated speed command $FC_{V\_0}$ to the speed command $PC_{V\_2}$ for the servo motors 32 so as to cause the scraper 42 to move in a direction toward the surface Q (i.e., downward) at a speed $V_{F\_0}$ corresponding to (specifically, coincident with) the speed command $FC_{V\_0}$. As a result, the moving mechanism 18 causes the scraper 42 to move in a direction MD' in FIG. 13 after passing though the teaching point $TP_1$.

Figure 14:
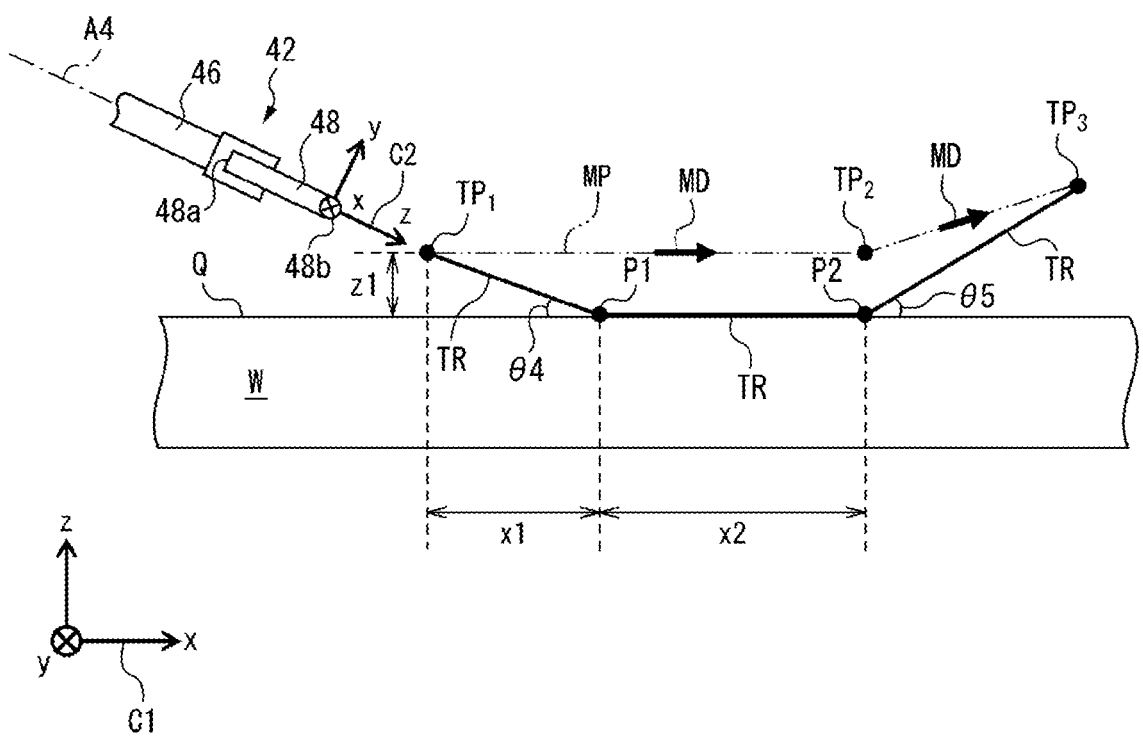
FIG. 14 illustrates a trajectory along which the one of the scrapers actually moves during the scraping process.

In FIG. 14, a trajectory TR that the scraper 42 (specifically, the distal end 48b) actually follows during the (2 m−1)th scraping process $SC_{2\ m-1}$ is indicated by a solid line. After passing through the teaching point $TP_1$, the scraper 42 moves toward the surface Q in the trajectory TR that is inclined to form an angle θ4 (<90°) with the surface Q and comes into contact with the surface Q at a position P1.

When distances between the teaching point $TP_1$ and the position P1 in FIG. 14 in the x-axis direction and the z-axis direction of the robot coordinate system C1 are respectively a distance x1 and a distance z1, the distance x1, the distance z1, the speed command $PC_{V\_2}$ (speed $V_{P\_2}$), and the speed command $FC_{V\_0}$ (speed $V_{F\_0}$) satisfy the following equation (1).

$$z1/x1 = FC_{V\_0}/PC_{V\_2} = V_{F\_0}/V_{P\_2} \qquad (1)$$

The angle θ4, the distances x1 and z1, the speed command $PC_{V\_2}$ (speed $V_{P\_2}$), and the speed command $FC_{V\_0}$ (speed $V_{F\_0}$) also satisfy the following equation (2).

$$\theta 4 = \tan^{-1}(z1/x1) = \tan^{-1}(FC_{V\_0}/PC_{V\_2}) = \tan^{-1}(V_{F\_0}/V_{P\_2}) \qquad (2)$$

Thus, if x1=10 [mm] and z1=5 [mm] are set as machining conditions MC for the scraping process, then the angle θ4 can be determined to be θ4≈26.6° by the equation (2). In this case, when the speed $V_{P\_2}$ (i.e., the speed command $PC_{V\_2}$) is set to 100 [mm/sec] as one of the machining conditions MC, the speed $V_{F\_0}$ (i.e., the speed command $FC_{V\_0}$) can be determined to be 50 [mm/sec] by the equation (1). In this manner, by appropriately setting the distances x1 and z1, the speed command $PC_{V\_2}$ (speed $V_{P\_2}$), and the speed command $FC_{V\_0}$ (speed $V_{F\_0}$) as the machining conditions MC, the angle θ4 can be controlled to fall within a desired range (e.g., 15° to 35°).

Note that the processor 60 may automatically determine at least one parameter of these machining conditions MC (x1, z1, θ4, $V_{P\_2}$, $PC_{V\_2}$, $V_{F\_0}$, and $FC_{V\_0}$) in accordance with other parameters of the machining conditions MC input by the operator. For example, it is assumed that the operator inputs x1=10 [mm], z1=5 [mm], and $V_{P\_2}$ ($PC_{V\_2}$)=100 [mm/sec] as the machining conditions MC by operating the input device 66. In this case, based on the input data of the machining conditions MC and the above-described equations (1) and (2), the processor 60 automatically determines θ4=26.6° and $V_{F\_0}$ ($FC_{V\_0}$)=50 [mm/sec] as other parameters of the machining conditions MC.

While the scraper 42 is in contact with the surface Q, the processor 60 causes the scraper 42 to move in the direction MD in accordance with the position control command $PC_2$, and generates a speed command $FC_{V\_1}$ as the force control command FC for controlling the pressing force F to be at the target value φ through the force control. In accordance with the speed command $FC_{V\_1}$, the position of the wrist flange 30b of the moving mechanism 18 is shifted in the z-axis direction of the robot coordinate system C1 at a speed $V_{F\_1}$ corresponding to (specifically, coincident with) the speed command $FC_{V\_1}$.

A maximum value of the speed command $FC_{V\_1}$ (i.e., the speed $V_{F\_1}$) generated while the scraper 42 is in contact with the surface Q can be set to be greater than the speed command $FC_{V\_0}$ (i.e., the speed $V_{F\_0}$) generated before the scraper 42 comes into contact with the surface Q. In this way, the processor 60 causes the moving mechanism 18 to move the scraper 42 rightward along the surface Q while pressing the scraper 42 at the pressing force F having a magnitude corresponding to the target value φ, thereby executing the scraping process $SC_{2\ m-1}$ of scraping the surface Q with the distal end 48b of the scraper 42.

When the scraper 42 (or the wrist flange 30b) reaches a position corresponding to the teaching point $TP_2$, the processor 60 terminates the force control and generates a position control command $PC_3$ for causing the scraper 42 to move to the teaching point $TP_3$. The processor 60 then operates the robot 12 in accordance with the position control command $PC_3$ to move the scraper 42 right upward to the teaching point $TP_3$.

As a result, the scraper 42 moves right upward in the trajectory TR that is inclined to form an angle θ5 (<90°) with the surface Q of the workpiece W, and the distal end 48b of the scraper 42 separates from the surface Q at a position P2. In this manner, the surface Q is scraped by the scraper 42 over a distance x2 from the position P1 to the position P2, and the (2 m−1)th scraping process $SC_{2\ m-1}$ is completed.

Note that in the present embodiment, it is assumed that a coordinate of the position P2 in the x-axis direction of the robot coordinate system C1 is substantially equal to the teaching point $TP_2$. Subsequently, the scraper 42 reaches the teaching point $TP_3$ (or a position immediately below the teaching point $TP_3$). The recess $R_{2\ m-1}$ having a length x2 in the x-axis direction of the robot coordinate system C1 is formed in the surface Q through the (2 m−1)th scraping process $SC_{2\ m-1}$ executed as described above.

Figure 15:
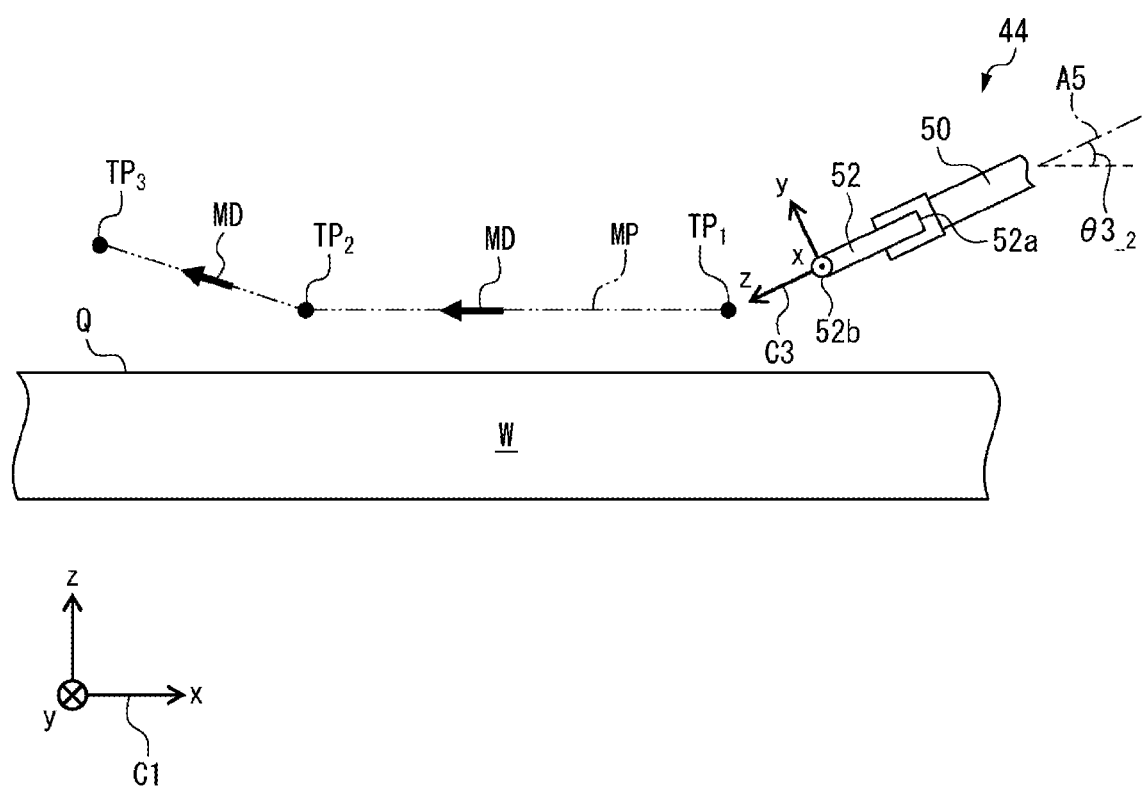
FIG. 15 illustrates an example of teaching points set with respect to the surface of the workpiece for forming a recess by the other of the scrapers.

The processor 60 executes the 2m-th scraping process $SC_{2\ m}$ of forming the above-described recess $R_{2\ m}$ in a similar manner to the (2 m−1)th scraping process $SC_{2\ m-1}$. Specifically, three teaching points $TP_n$ (n=1, 2, 3) for forming the recess $R_{2\ m}$ are set along the surface Q as illustrated in FIG. 15. In the present embodiment, the teaching point $TP_n$ for forming the recess $R_{2\ m}$ illustrated in FIG. 15 is symmetrical to the teaching point $TP_n$ for forming the recess $R_{2\ m-1}$ illustrated in FIG. 12 with respect to a plane parallel to a y-z plane of the robot coordinate system C1.

The processor 60 then executes the position control and the force control in the 2m-th scraping process $SC_{2\ m}$ in a similar manner to the above-described (2 m−1)th scraping process $SC_{2\ m-1}$. Specifically, after the scraper 42 reaches the teaching point $TP_3$ illustrated in FIG. 14 in the (2 m−1)th scraping process $SC_{2\ m-1}$, the processor 60 causes the base 34 to rotate to the second orientation OR2, starts the position control, and generates a position control command $PC_n$ for causing the moving mechanism 18 to move the distal end 52b of the scraper 44 (the origin of the tool coordinate system C3: TCP) to the teaching point $TP_n$ illustrated in FIG. 15.

When the scraper 44 reaches the teaching point $TP_1$ illustrated in FIG. 15, the processor 60 starts the force control and generates a force control command FC for controlling the position of the wrist flange 30b of the moving mechanism 18 in order to control the pressing force F (the reaction force F′) obtained based on the detection data of the force sensor 14 to be at the target value φ.

While the scraper 44 is in contact with the surface Q, the processor 60 causes the scraper 44 to move in the direction MD in accordance with the position control command $PC_2$ and causes the position of the wrist flange 30b of the moving mechanism 18 to shift in the z-axis direction of the robot coordinate system C1 in accordance with the force control command FC. When the scraper 44 (or the wrist flange 30b) reaches a position corresponding to the teaching point $TP_2$ in FIG. 15, the processor 60 then terminates the force control and generates a position control command $PC_3$ for causing the scraper 44 to move to the teaching point $TP_3$.

Figure 16:
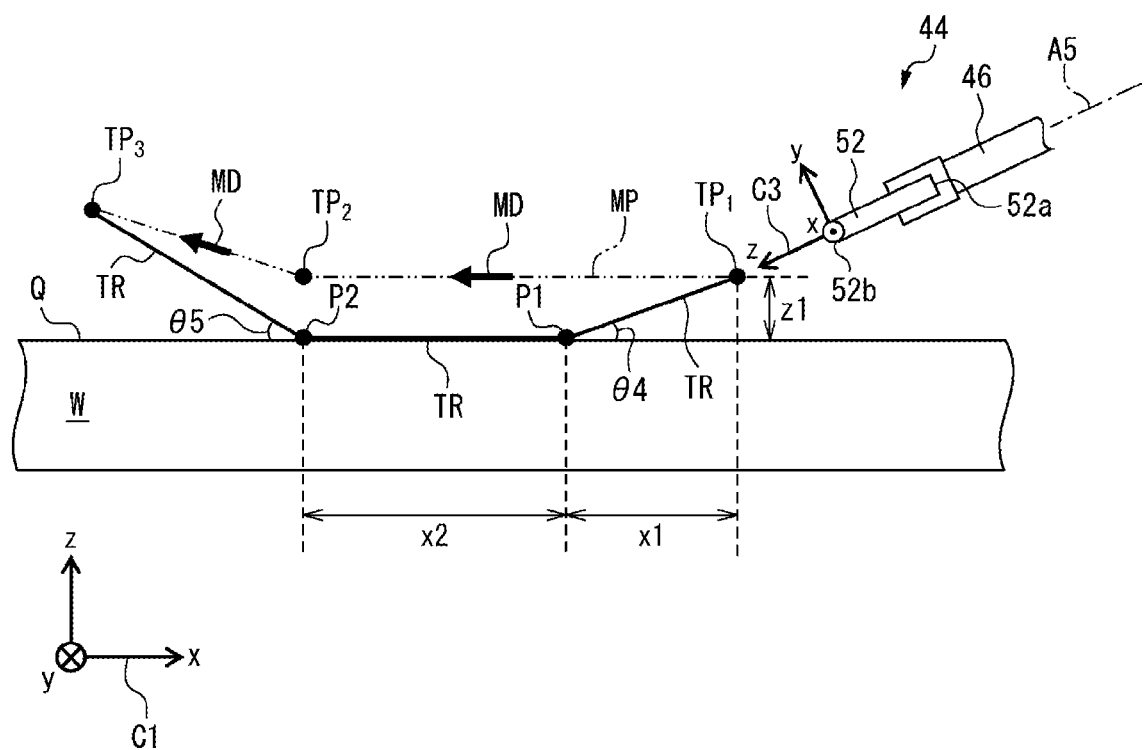
FIG. 16 illustrates a trajectory along which the other of the scrapers actually moves during the scraping process.

Through the position control and the force control, the processor 60 causes the distal end 52b of the scraper 44 to move along the trajectory TR illustrated in FIG. 16. As a result, the scraper 44 scrapes the surface Q over a distance x2 from a position P1 to a position P2 in FIG. 16, and thereby the recess $R_{2\ m}$ having a length x2 is formed in the surface Q.

Note that when the (2 m−1)th scraping process $SC_{2\ m-1}$ is completed (i.e., when the scraper 42 reaches the teaching point $TP_3$ in FIG. 14), the processor 60 may cause the base 34 to rotate to the second orientation OR2, and subsequently start the position control for the 2m-th scraping process $SC_{2\ m}$ and start an operation to move the scraper 44 to the teaching point $TP_1$ in FIG. 15 set for the next recess $R_{2m}$.

Similarly, when the 2m-th scraping process $SC_{2\ m}$ is completed (i.e., when the scraper 44 reaches the teaching point $TP_3$ in FIG. 16), the processor 60 may cause the base 34 to rotate to the first orientation OR1, and subsequently start the position control for the next scraping process $SC_{2\ m-1}$ and start an operation to move the scraper 42 to the teaching point $TP_1$ in FIG. 12 set for the next recess $R_{2\ m-1}$.

Alternatively, when the (2 m−1)th scraping process $SC_{2\ m-1}$ is completed, the processor 60 may start the position control for the 2m-th scraping process $SC_{2m}$, and subsequently rotate the base 34 from the first orientation OR1 to the second orientation OR2 while causing the scraper 44 to move to the teaching point $TP_1$ in FIG. 15.

Similarly, when the 2m-th scraping process $SC_{2\ m}$ is completed, the processor 60 may start the position control for the next scraping process $SC_{2\ m-1}$, and subsequently rotate the base 34 from the second orientation OR2 to the first orientation OR1 while causing the scraper 42 to move to the teaching point $TP_1$ in FIG. 12. In this case, the processor 60 executes an operation to move the scraper 42 or 44 to the next teaching point $TP_n$ and an operation to rotate the base 34 about the axis A1 in parallel.

Figure 17:
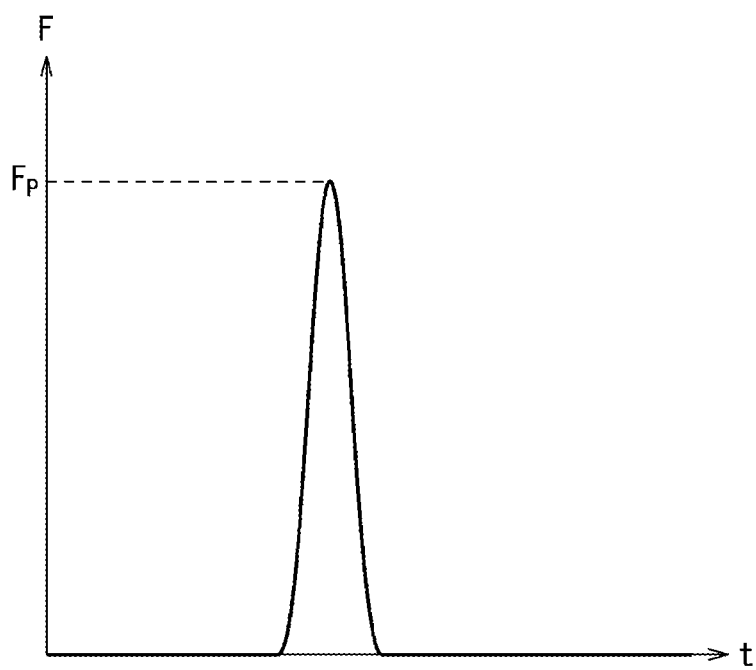
FIG. 17 illustrates an example of a time change characteristic of a pressing force during the scraping process.

FIG. 17 schematically illustrates a time change characteristic of the pressing force F when the force control is executed in the scraping process SC of forming the recesses $R_1$ to $R_7$ illustrated in FIG. 10. As illustrated in FIG. 17, after the processor 60 causes the scraper 42 or 44 to come into contact with the surface Q at the position P1, the pressing force F rapidly increases to reach a peak value $F_P$. Subsequently, the pressing force F rapidly decreases as the scraper 42 or 44 approaches the teaching point $TP_2$, and becomes 0 when the scraper 42 or 44 separates from the surface Q at the position P2.

Since the length x2 of each of the recesses $R_1$ to $R_7$ in FIG. 10 is comparatively short, a distance (x1+x2) between the teaching point $TP_1$ and the teaching point $TP_2$ is set to be comparatively short. In this case, the processor 60 causes the scraper 42 or 44 to move upward before (or when) the pressing force F reaches the target value φ of the force control. Thus, in the present embodiment, the peak value $F_P$ is equal to or smaller than a target value φ.

Figure 18:
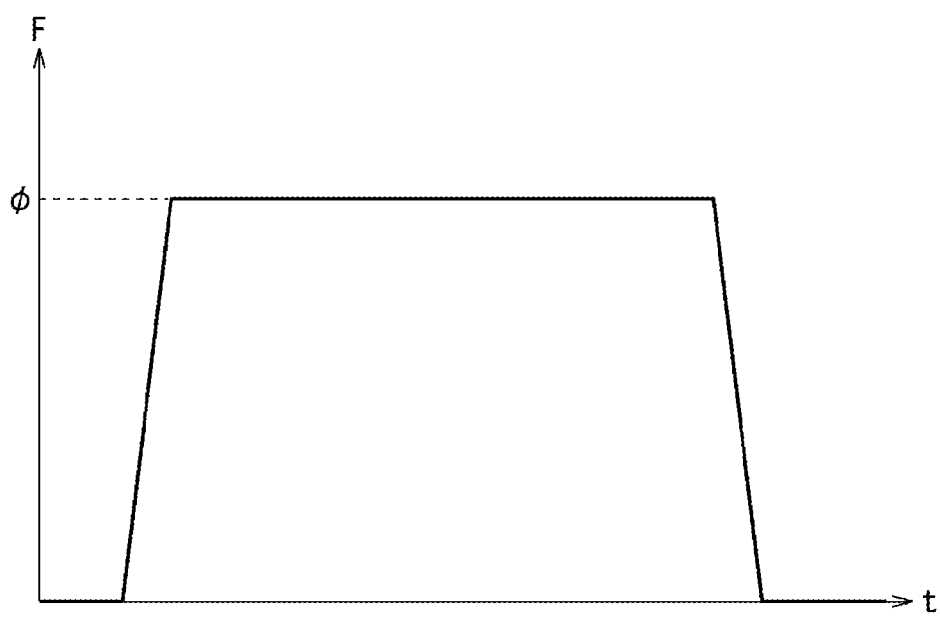
FIG. 18 illustrates another example of a time change characteristic of the pressing force during the scraping process.

On the other hand, FIG. 18 schematically illustrates a time change characteristic of the pressing force F when the force control is executed in the scraping process SC for forming the recesses $R_1$ and $R_2$ illustrated in FIG. 11. As illustrated in FIG. 18, after the processor 60 causes the scraper 42 or 44 to come into contact with the surface Q at the position P1, the pressing force F rapidly increases to reach the target value φ.

Subsequently, the processor 60 causes the scraper 42 or 44 to move in the direction MD through the position control while controlling the position of the wrist flange 30b so as to continuously maintain the pressing force F at the target value φ through the force control. Subsequently, the pressing force F rapidly decreases as the scraper 42 or 44 approaches the teaching point $TP_2$, and becomes 0 when the scraper 42 or 44 separates from the surface Q at the position P2. The processor 60 controls the pressing force F so as to have the magnitude illustrated in FIG. 17 or FIG. 18 by executing the force control.

Note that the processor 60 may continuously execute the force control in parallel with the position control until the scraper 42 or 44 reaches the teaching point $TP_3$ after passing through the teaching point $TP_1$. In this case, the position control becomes more predominant over the force control as the scraper 42 or 44 approaches the teaching point $TP_2$, and the processor 60 causes the scraper 42 or 44 (wrist flange 30b) to move in a direction away from the surface Q (i.e., upward) before reaching a position corresponding to the teaching point $TP_2$.

The processor 60 subsequently causes the scraper 42 or 44 to move away from the surface Q at the position P2 and move toward the teaching point $TP_3$ along the trajectory TR that is inclined to form the angle θ5. In this case, the position P2 is shifted from the teaching point $TP_2$ toward the teaching point $TP_3$ side (i.e., to the right side in FIG. 14 or to the left side in FIG. 16), and the end point of the trajectory TR of the distal end 48b or 52b of the scraper 42 or 44 is located below the teaching point $TP_3$. Also in this case can the pressing force F be controlled as illustrated in FIG. 17 or FIG. 18.

As described above, in the present embodiment, the robot 12 includes the pair of scrapers 42 and 44 extending so as to approach each other as extending from the proximal ends 46a and 48a toward the distal ends 48b and 52b, and the moving mechanism 18 that rotates the base 34 between the first orientation OR1 and the second orientation OR2.

According to this configuration, the scrapers 42 and 44 are switched by rotating the base 34 between the first orientation OR1 and the second orientation OR2, and the recess $R_{2\ m-1}$ can be formed by the scraper 42 and the recess $R_{2\ m}$ can be formed by the scraper 44. This makes it possible to shorten a time from the end of the (2 m−1)th scraping process $SC_{2\ m-1}$ for forming one recess $R_{2\ m-1}$ to the start of the 2m-th scraping process $SC_{2\ m}$ for forming the next recess $R_{2m}$, and thus a plurality of recesses R can be consecutively and efficiently formed in the surface Q. Accordingly, the cycle time of the scraping process can be reduced, and thus the productivity can be improved.

In the present embodiment, the base 34 extends along the axis A3 (first axis), and the pair of scrapers 42 and 44 are arranged so as to be opposite each other in the axis A3 direction. The moving mechanism 18 rotates the base 34 about the axis A1 (second axis) arranged to be orthogonal to the axis A3. According to this configuration, the orientation OR of the base 34 can be quickly switched between the first orientation OR1 and the second orientation OR2 with high accuracy.

In the present embodiment, the pair of scrapers 42 and 44 are arranged symmetrically to each other with respect to the axis A2 (third axis) that is orthogonal to the axes A1 and A3. According to this configuration, when the orientation OR of the base 34 is switched between the first orientation OR1 and the second orientation OR2, the angles by which the base 34 is rotated about the axis A1 can be made common.

Accordingly, a movement amount of the base 34 at the time of switching the orientation OR can be minimized, and thus the cycle time of the scraping process can be reduced, and the control for switching the orientation OR can be simplified. Since the magnitudes of the moments applied to the wrist 30 can be equalized when the orientation OR of the base 34 is switched, the orientation of the end effector 20 can be controlled with high accuracy.

Figure 19:
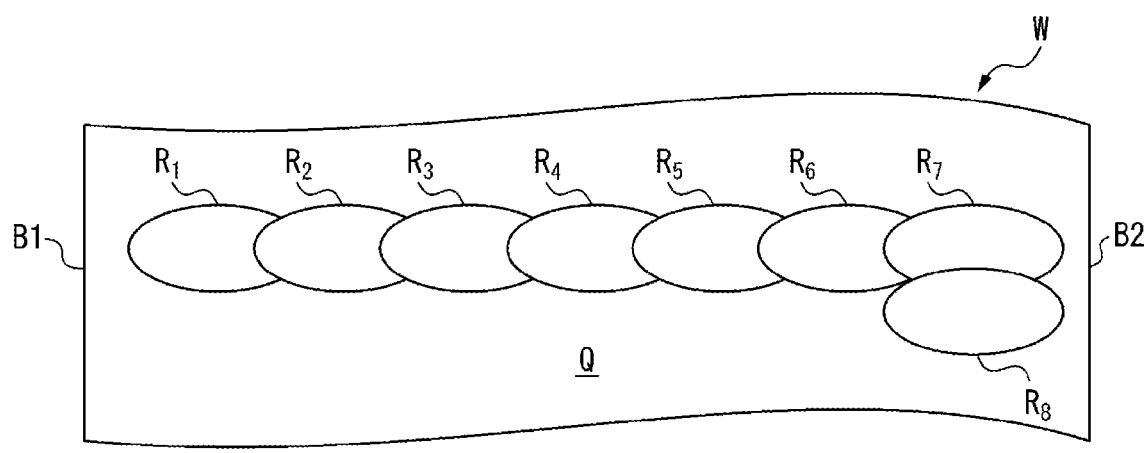
FIG. 19 is a diagram for illustrating a scraping process to form a plurality of rows of recesses.
Figure 19:
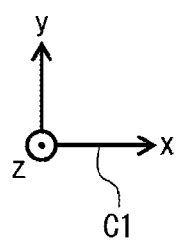

Note that, after forming the recess $R_7$ illustrated in FIG. 10, the processor 60 may consecutively form a second row of recesses $R_8$ to $R_{14}$ on a rear side of the first row of the recesses $R_1$ to $R_7$. Such a scraping process will be described with reference to FIG. 19. After forming the recess $R_7$ with the scraper 42, the processor 60 rotates the base 34 from the first orientation OR1 to the second orientation OR2, and forms the recess $R_8$ adjacent to a rear side of the recess $R_7$ with the scraper 44.

Figure 20:
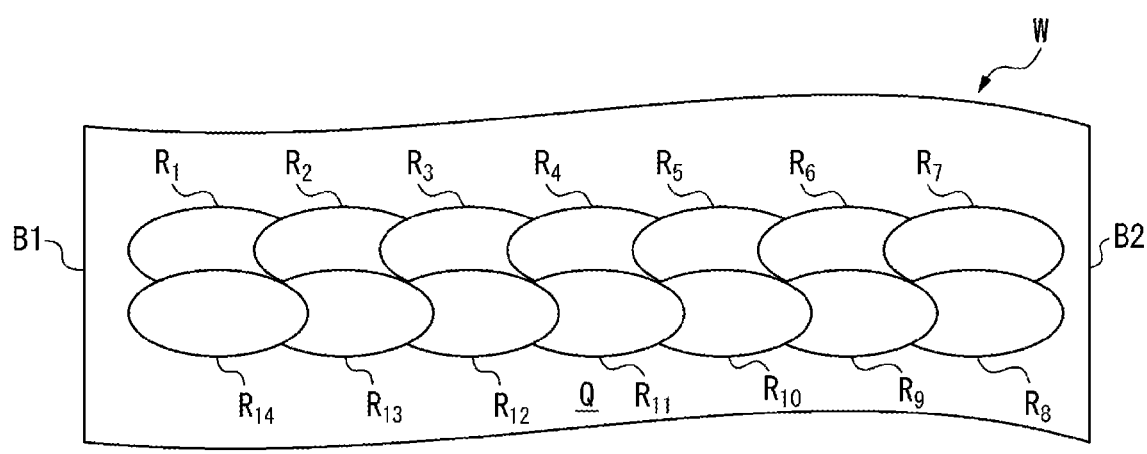
FIG. 20 is a diagram for illustrating the scraping process to form the plurality of rows of recesses.
Figure 20:
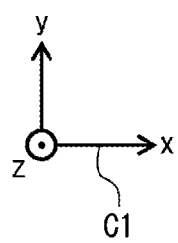

The processor 60 subsequently switches the orientation of the base 34 between the first orientation OR1 and the second orientation OR2 to form the recess $R_{2\ m-1}$ with the scraper 42 and form the recess $R_{2\ m}$ with the scraper 44. Accordingly, as illustrated in FIG. 20, the second row of the recesses $R_8$ to $R_{14}$ is formed in order from the right end edge B2 to the left end edge B1 at the rear side of the first row of the recesses $R_1$ to $R_7$. Among the recesses $R_1$ to $R_{14}$, the teaching points $TP_1$ to $TP_3$ illustrated in FIG. 12 are set for the recess $R_{2\ m-1}$, and the teaching points $TP_1$ to $TP_3$ illustrated in FIG. 15 are set for the recess $R_{2m}$. The processor 60 executes the position control and the force control described above to form the recesses $R_1$ to $R_{14}$.

Figure 21:
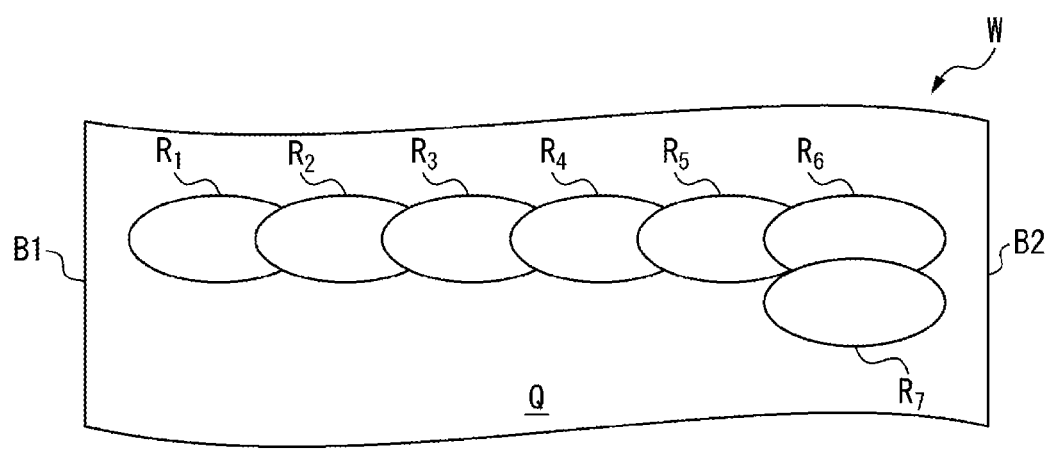
FIG. 21 is a diagram for illustrating a scraping process to form a plurality of rows of recesses.
Figure 21:
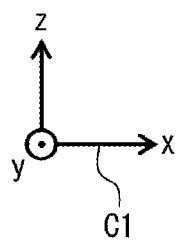

Note that when the recess $R_6$ is adjacent to the right end edge B2 as illustrated in FIG. 21, the processor 60 rotates the base 34 from the second orientation OR2 to the first orientation OR1 after forming the recess $R_6$ with the scraper 44, and forms the recess $R_7$ adjacent to a rear side of the recess $R_6$ with the scraper 42.

Figure 22:
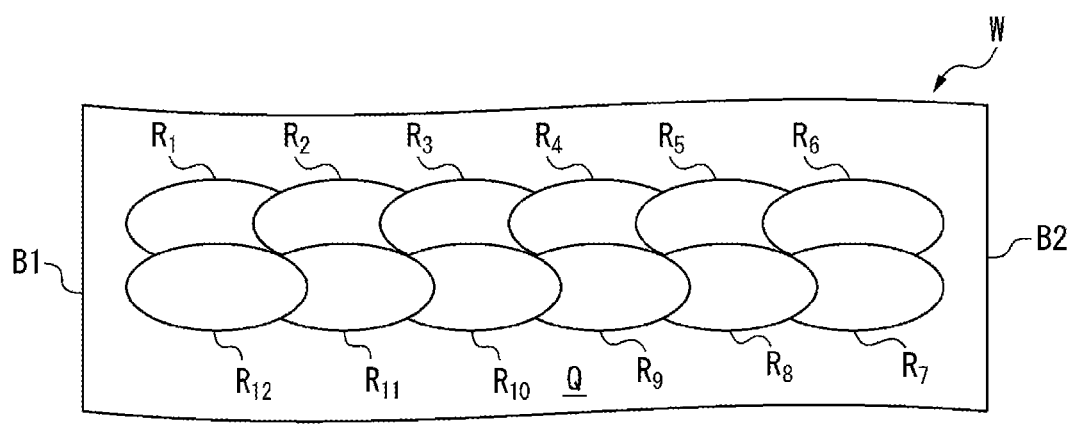
FIG. 22 is a diagram for illustrating the scraping process to form the plurality of rows of recesses.
Figure 22:
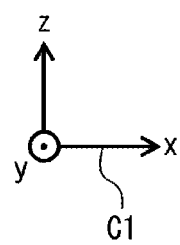

The processor 60 subsequently switches the orientation of the base 34 between the first orientation OR1 and the second orientation OR2 to form the recess $R_{2\ m-1}$ with the scraper 42 and form the recess $R_{2\ m}$ with the scraper 44. Accordingly, as illustrated in FIG. 22, the second row of the recesses $R_7$ to $R_{12}$ is formed in order from the right end edge B2 to the left end edge B1 at a rear side of the first row of the recesses $R_1$ to $R_6$.

Note that the processor 60 can also switch the orientation of the base 34 between the first orientation OR1 and the second orientation OR2 to form the recess $R_{2\ m-1}$ by moving the scraper 44 leftward and form the recess $R_{2\ m}$ by moving the scraper 42 rightward. The processor 60 automatically executes the scraping process SC described above in accordance with a computer program PG. The computer program PG may be provided in a form recorded in the memory 62 as a computer-readable recording medium such as a semiconductor memory, a magnetic recording medium, or an optical recording medium.

Figure 23:
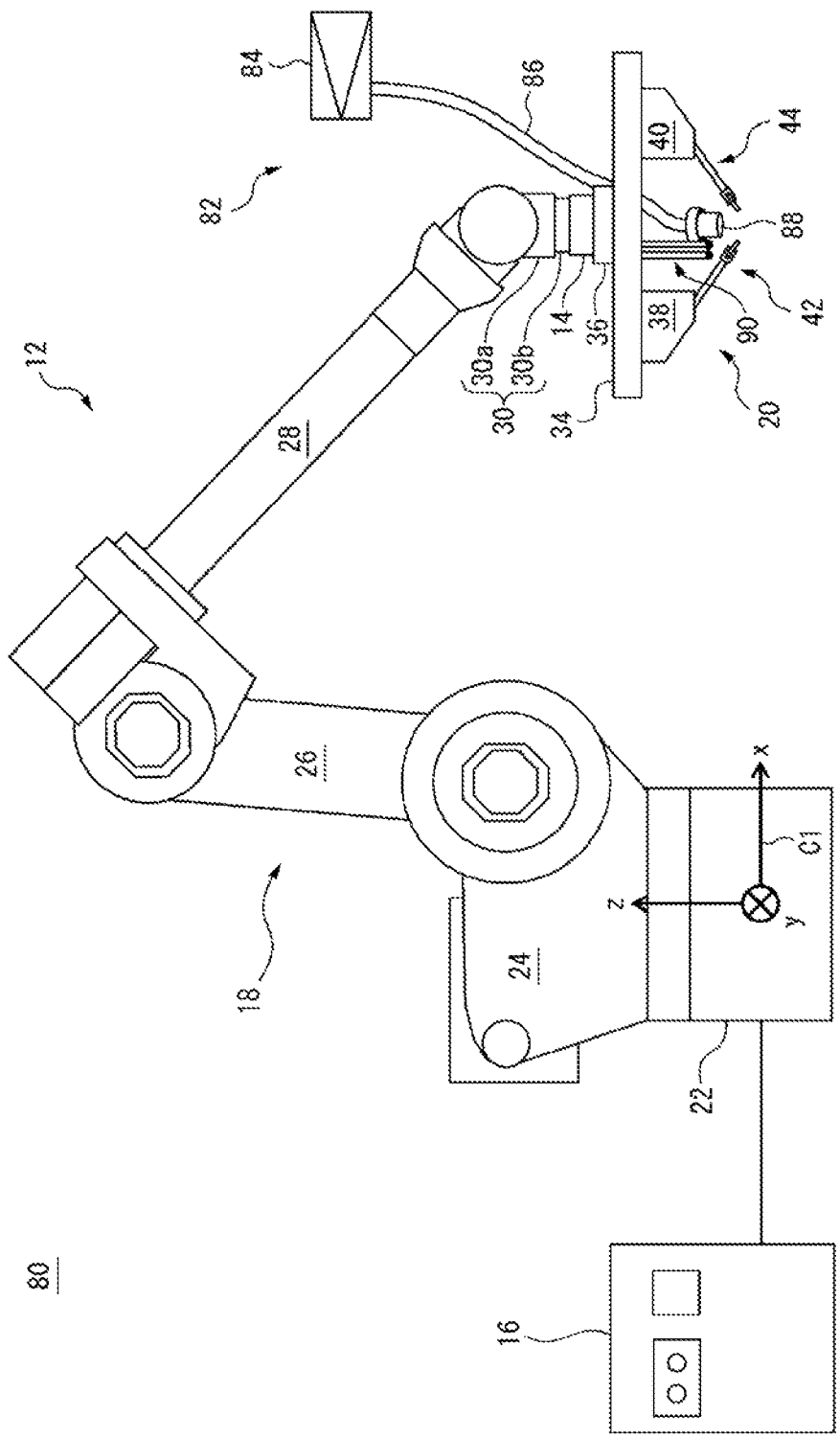
FIG. 23 is a diagram of a robot system according to another embodiment.
Figure 24:
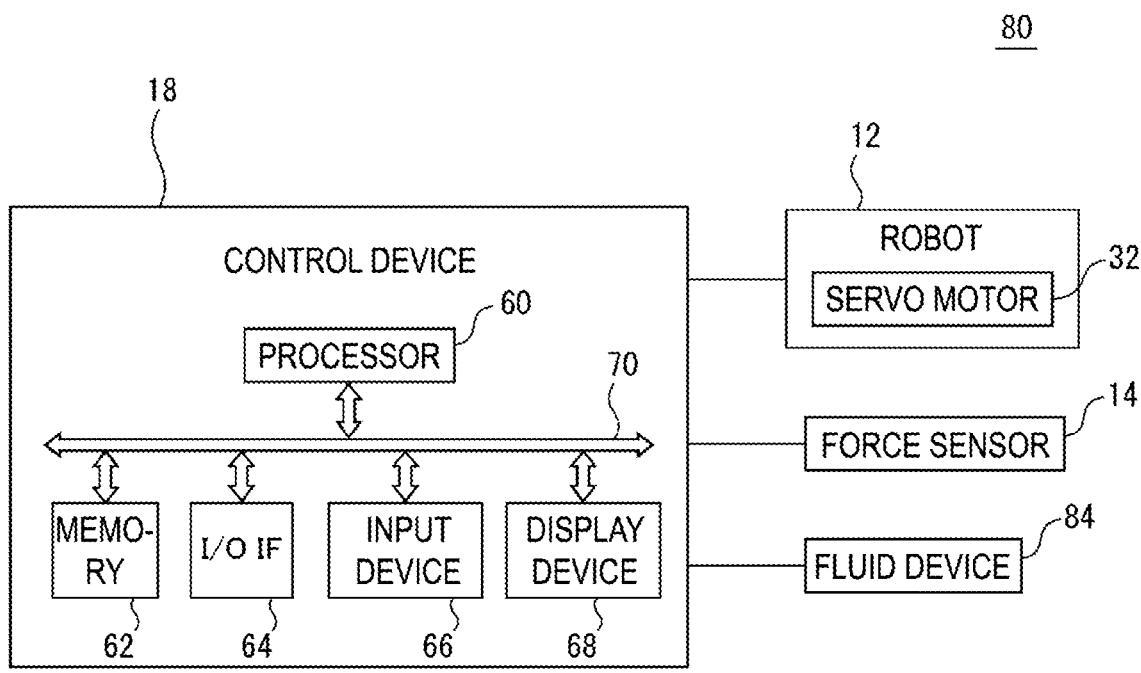
FIG. 24 is a block diagram of the robot system illustrated in FIG. 23.

A robot system 80 according to another embodiment will be described next with reference to FIG. 23 to FIG. 25. The robot system 80 differs from the robot system 10 described above in that the robot system 80 further includes a cleaning device 82. The cleaning device 82 includes a fluid device 84 and a hose 86. For example, the fluid device 84 is an electric pump for supplying or suctioning a fluid (e.g., compressed gas). One end of the hose 86 is connected to the fluid device 84 and the other end thereof has an opening 88. The fluid device 84 supplies a fluid to the hose 86 and sprays the fluid from the opening 88 to the outside. Alternatively, the fluid device 84 suctions outside air through the opening 88.

Figure 25:
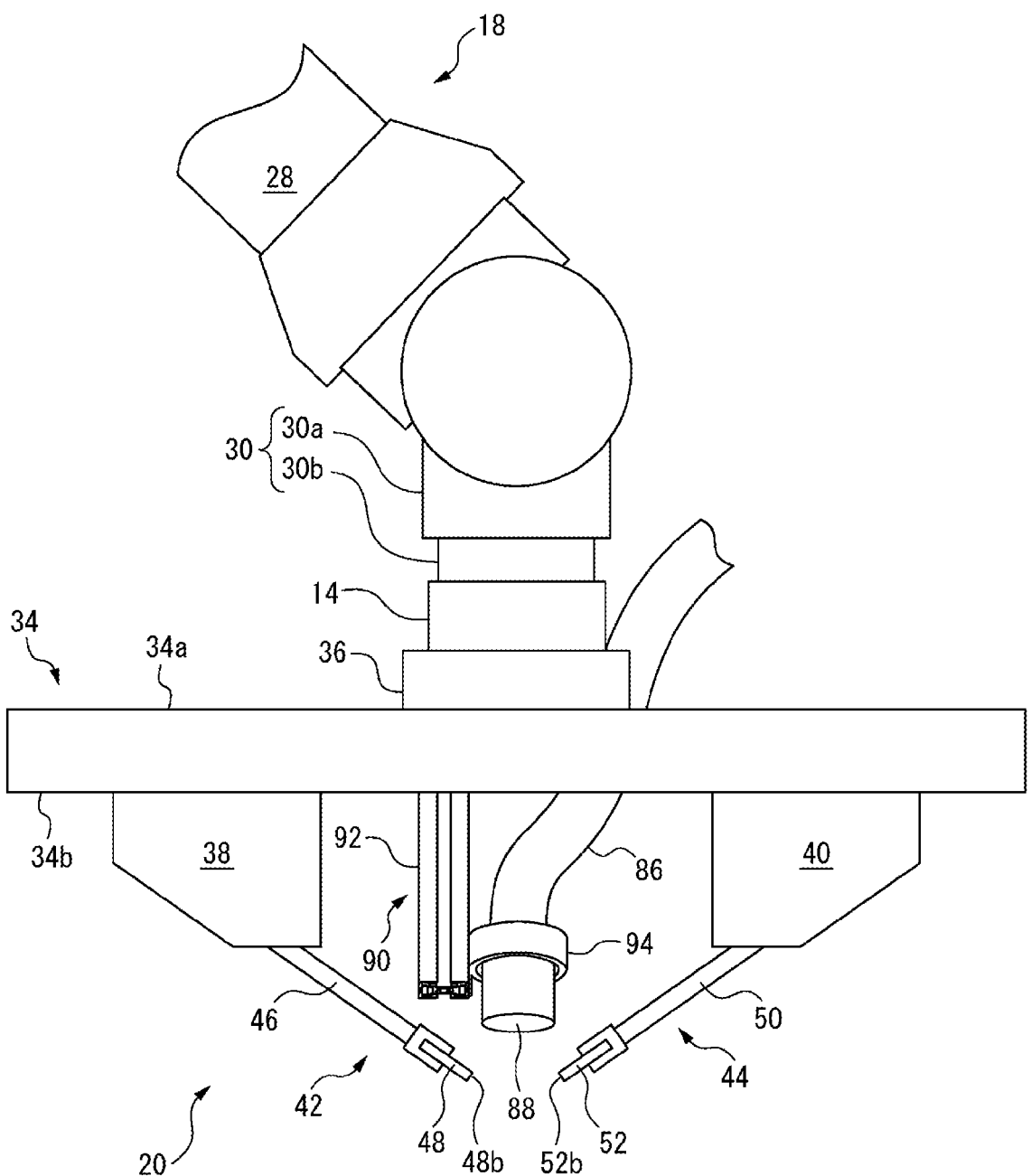
FIG. 25 is an enlarged view of an end effector illustrated in FIG. 23.

On the other hand, the robot 12 is provided with a mounting member 90 as illustrated in FIG. 25. The mounting member 90 includes a rod 92 and a retaining ring 94 fixed to a distal end of the rod 92. A proximal end of the rod 92 is fixed to a movable element (e.g., the upper arm 28 or the wrist 30) of the moving mechanism 18 or the end effector 20 (e.g., the base 34).

The hose 86 of the cleaning device 82 is inserted into the retaining ring 94 as to be fixed in an inside thereof. The retaining ring 94 retains the hose 86 such that the opening 88 of the hose 86 is arranged between the distal ends 48b and 52b of the pair of scrapers 42 and 44, and is directed toward the distal ends 48b and 52b.

While executing the scraping process SC with the scraper 42 or 44, the processor 60 operates the fluid device 84 to blow away chips produced by the scraping process with the fluid sprayed from the opening 88 or suction the chips into the hose 86 through the opening 88 by suctioning outside air from the opening 88. The cleaning device 82 can suppress the chips produced during the scraping process from adhering to the scraper 42 or 44, and can thus improve processing quality.

Figure 26:
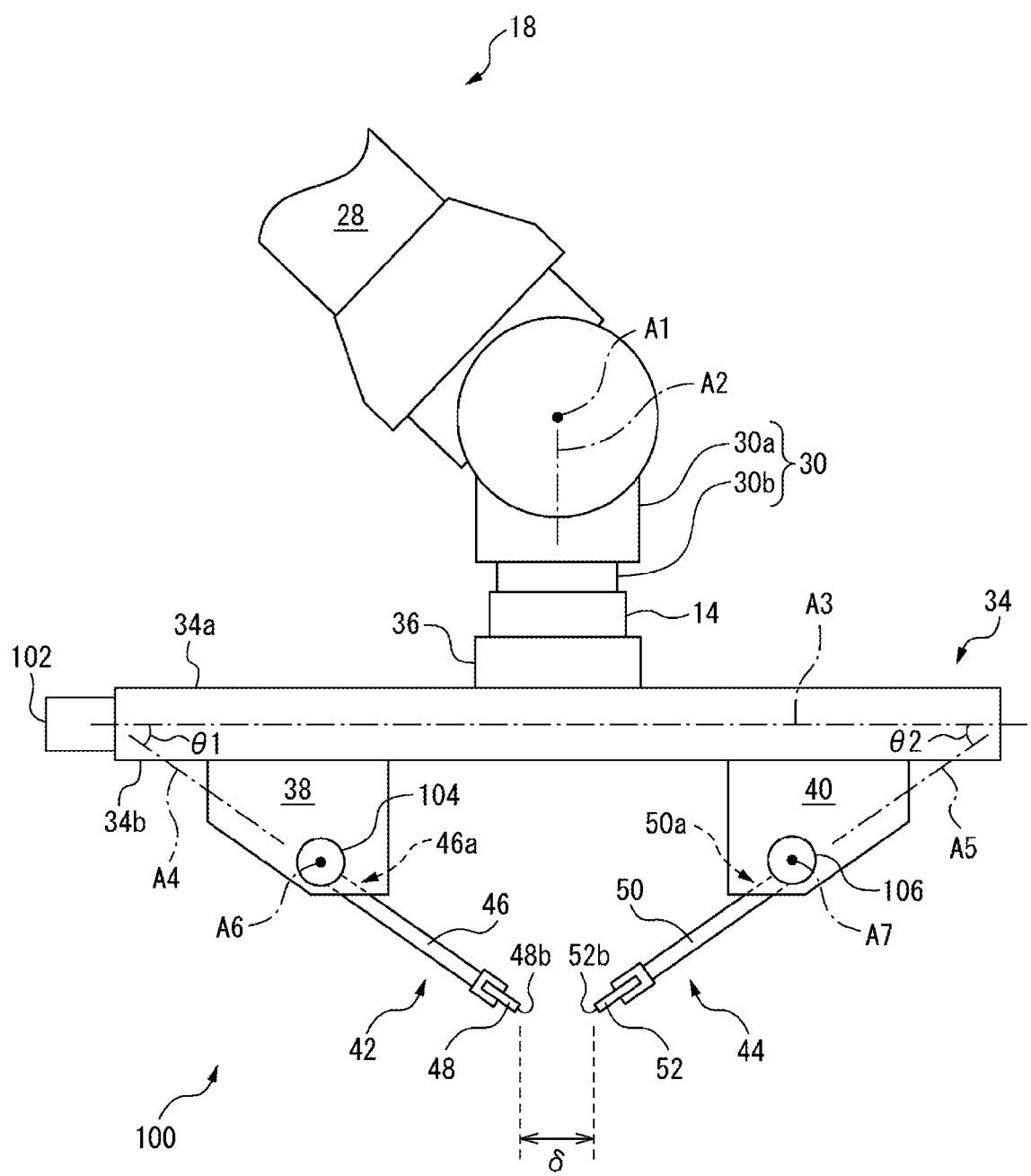
FIG. 26 is an enlarged view of an end effector according to another embodiment.

An end effector 100 according to another embodiment will be described next with reference to FIG. 26. The end effector 100 can be removably attached to the wrist flange 30b via the force sensor 14 instead of the above-described end effector 20. The end effector 100 differs from the above-described end effector 20 in the following configuration.

Specifically, in the end effector 100, each of the scraper holders 38 and 40 is disposed at the base 34 so as to be movable along the axis A3 direction. For example, a rail (not illustrated) extending along the axis A3 direction is disposed at the bottom surface 34b of the base 34, and each of the scraper holders 38 and 40 includes an engaging section slidably engaging with the rail at an upper surface of each of the scraper holders 38 and 40. Accordingly, the scraper holders 38 and 40 engage with the base 34 so as to be slidable along the axis A3 direction.

The scraper 42 is held by the scraper holder 38 such that the proximal end 46a of the handle 46 is rotatable about an axis A6. Similarly, the scraper 44 is held by the scraper holder 40 such that the proximal end 50a of the handle 50 is rotatable about an axis A7. The axes A6 and A7 are parallel to each other and orthogonal to the axis A3. Accordingly, the scraper 42 is rotatably disposed at the base 34 via the scraper holder 38, and the scraper 44 is rotatably disposed at the base 34 via the scraper holder 40.

The end effector 100 further includes scraper driving units 102, 104, and 106. The scraper driving unit 102 includes, for example, a servo motor and is fixed to the base 34. The scraper driving unit 102 synchronously moves the scraper holders 38 and 40 so as to approach or separate from each other in response to a command from the control device 16.

More specifically, a ball screw mechanism (not illustrated) is disposed inside the base 34, and the scraper driving unit 102 can synchronously move the scraper holders 38 and 40 (i.e., the scrapers 42 and 44) so as to approach or separate from each other by operating the ball screw mechanism. This makes it possible to change the spacing δ between the distal end 48b of the scraper 42 and the distal end 52b of the scraper 44.

On the other hand, the scraper driving unit 104 includes, for example, a servo motor and is fixed to the scraper holder 38. The scraper driving unit 104 rotates the scraper 42 around the axis A6 in response to a command from the control device 16, thereby changing the angle θ1 of the axis A4 with respect to the axis A3.

Similarly, the scraper driving unit 106 includes, for example, a servo motor and is fixed to the scraper holder 40. The scraper driving unit 106 rotates the scraper 44 around the axis A7 in response to a command from the control device 16, thereby changing the angle θ2 of the axis A5 with respect to the axis A3.

As an example, the operator may operate the input device 66 to input the spacing δ as one of the machining conditions MC. In this case, the processor 60 operates the scraper driving unit 102 to automatically arrange the scraper holders 38 and 40 such that the spacing between the distal ends 48b and 52b is the input spacing δ.

As another example, the operator may operate the input device 66 to input the angles θ1 and θ2 as the machining conditions MC. In this case, the processor 60 operates the scraper driving units 104 and 106 to rotate the scrapers 42 and 44 such that the input angles θ1 and θ2 are obtained.

As still another example, the operator may operate the input device 66 to input at least one parameter MC1 of the angles θ1 and θ2, the angle θ3 illustrated in FIG. 5 (specifically, an angle $θ3_{-1}$ in FIG. 6 and an angle $θ3_{-2}$ in FIG. 8), the angle θ6 at which the base 34 is rotated between the first orientation OR1 and the second orientation OR2, the above-described spacing δ, or dimensions DM of the scrapers 42 and 44 (e.g., the lengths of the blades 48 and 52 along the axes A4 and A5 directions) among the machining conditions MC.

The processor 60 may automatically determine a parameter MC2 other than the input parameter MC1 among the machining conditions MC in accordance with the parameter MC1. For example, the operator inputs the angle θ3 and the dimensions DM as the parameter MC1. The processor 60 automatically determines the angles θ1 and θ2, the angle θ6, and the spacing δ as the parameter MC2 in accordance with the input parameter MC1. The processor 60 causes the scraper driving unit 102 to move the scrapers 42 and 44, and causes the scraper driving units 104 and 106 to rotate the scrapers 42 and 44 so as to obtain the angle θ1, the angle θ2, and the spacing δ determined.

In this case, a data table DT1 may be stored in advance in the memory 62, the data table DT1 having stored the parameter MC1 (e.g., the angle θ3 and the dimensions DM) and the parameter MC2 (e.g., the angle θ1 or θ2, the angle θ6, and the spacing δ) in association with each other. The processor 60 can search for the parameter MC2 corresponding to the input parameter MC1 in the data table DT1 to automatically determine the parameter MC2.

Note that the processor 60 may determine the parameter MC2 in accordance with the input parameter MC1 such that the angle θ6 is minimized. According to this configuration, it is possible to reduce the movement amount of rotating the base 34 between the first orientation OR1 and the second orientation OR2 in the scraping process, and thus the cycle time can be reduced. The processor 60 may generate image data of an input screen for the operator to input the machining conditions MC and cause the display device 68 to display the image data.

As described above, in the present embodiment, the pair of scrapers 42 and 44 are movably disposed at the base 34 such that the spacing δ is variable. The scrapers 42 and 44 are rotatably disposed at the base 34. According to this configuration, by appropriately setting the machining conditions MC (the angles θ1 and θ2, and the spacing δ), the arrangement of the scrapers 42 and 44 can be finely adjusted in accordance with application.

Figure 27:
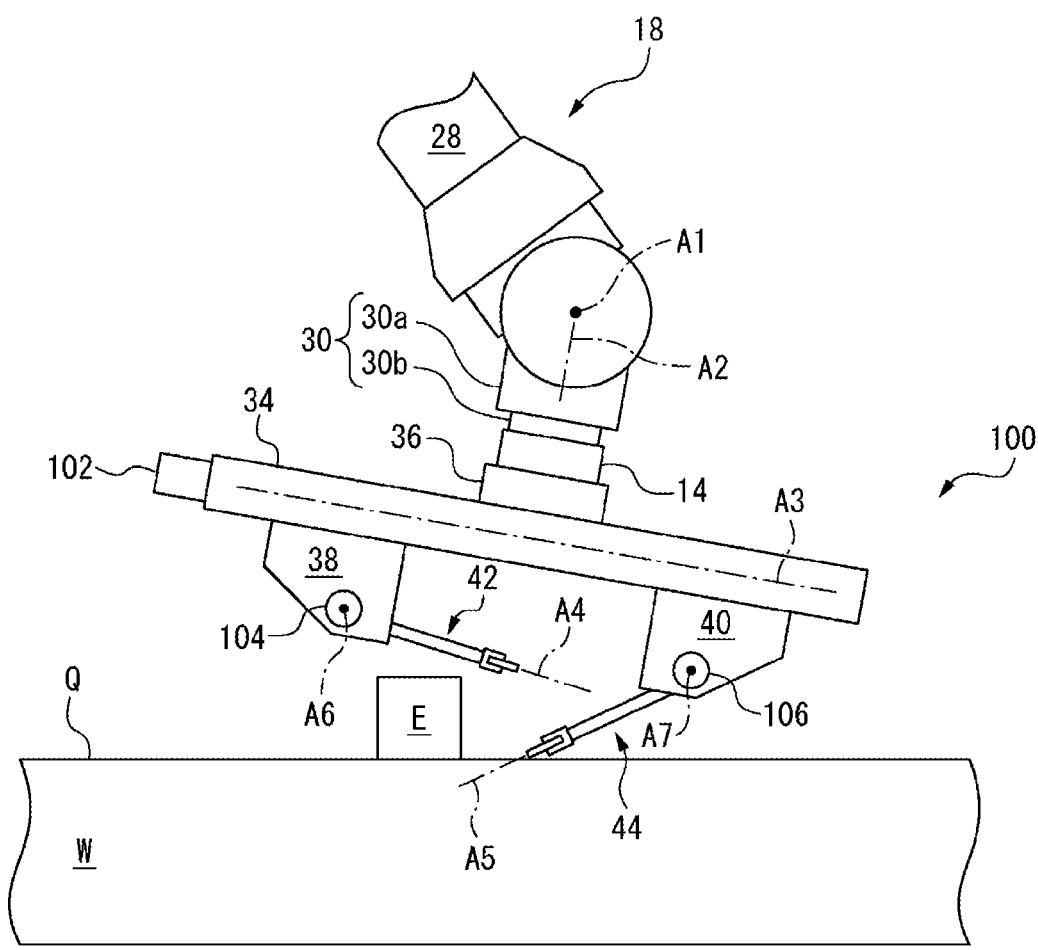
FIG. 27 is a diagram for illustrating a scraping process, using the end effector illustrated in FIG. 26.

Note that the processor 60 may cause the scraper 42 or 44 to rotate with respect to the base 34 when executing the scraping process SC, using the end effector 100. This function will be described with reference to FIG. 27. In the example illustrated in FIG. 27, a protrusion E protruding upward from the surface Q is formed on the surface Q. In such a case, when the scraping process to scrape the surface Q to the left is executed with the scraper 44, the other scraper 42 may interfere with the protrusion E.

In order to avoid such interference, when executing the scraping process with the scraper 44, the processor 60 operates the scraper driving unit 104 based on position data of the protrusion E in the robot coordinate system C1 to rotate the scraper 42 so as to move away from the protrusion E, thereby making it possible to suppress the interference between the scraper 42 and the protrusion E.

Note that one of the scrapers 42 and 44 may be movably disposed at the base 34, and the other may be fixed to the base 34. For example, in the case where only the scraper 42 is disposed at the base 34 so as to be movable along the axis A3, the processor 60 may suppress the interference between the scraper 42 and the protrusion E by operating the scraper driving unit 102 based on the position data of the protrusion E in the robot coordinate system C1 to move the scraper 42 away from the protrusion E when executing the scraping process with the scraper 44.

In the end effector 100, one of the scrapers 42 and 44 may be rotatably disposed at the base 34, and the other may be non-rotatably fixed to the base 34. For example, the scraper 42 may be rotatably disposed at the scraper holder 38, and the scraper 44 may be non-rotatably fixed to the scraper holder 40 in a state where the axis A5 of the scraper 44 is inclined at the angle θ2 with respect to the axis A3.

The blade 48 of the scraper 42 and the blade 52 of the scraper 44 may have dimensions DM different from each other. For example, a width of the blade 48 along a direction orthogonal to the axis A4 may be smaller (or larger) than a width of the blade 52 along a direction orthogonal to the axis A5. In this case, a width of the recess $R_{2\ m-1}$ formed by the scraper 42 is smaller (or larger) than a width of the recess $R_{2\ m}$ formed by the scraper 44.

After forming all the recesses $R_1$ to $R_7$ illustrated in FIG. 10 with the scraper 42 as rough machining, the processor 60 may move the scraper 44 leftward so as to pass over the recesses $R_1$ to $R_7$ from the right end edge B2 to the left end edge B1, thereby forming the recess $R_2$ illustrated in FIG. 11 overlapping the recesses $R_1$ to $R_7$ as finish machining.

According to this configuration, the processor 60 can selectively use the scrapers 42 and 44 to consecutively execute the rough machining and the finish machining. The width of the blade 48 of the scraper 42 that performs the rough machining may be smaller (or larger) than the width of the blade 52 of the scraper 44 that performs the finish machining.

Note that in the above-described embodiment, a case has been described in which the pair of scrapers 42 and 44 extend so as to approach each other as extending from the proximal ends 46a and 50a toward the distal ends 48b and 52b. However, the pair of scrapers 42 and 44 may extend so as to separate from each other as extending from the proximal ends 46a and 50a toward the distal ends 48b and 52b.

Figure 28:
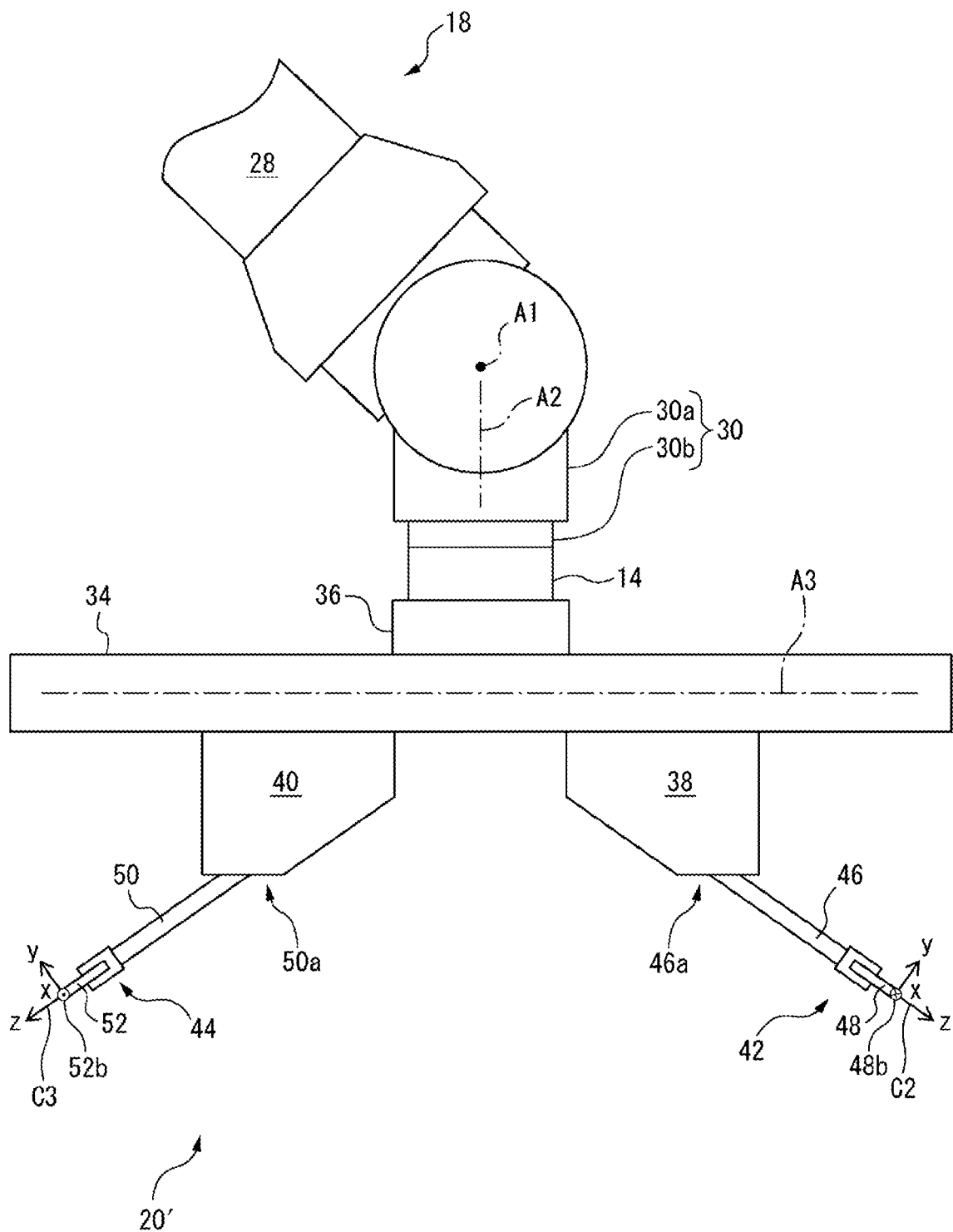
FIG. 28 is an enlarged view of an end effector according to still another embodiment.

Such an embodiment is illustrated in FIG. 28. An end effector 20' illustrated in FIG. 28 differs from the above-described end effector 20 in that the positions of the scraper holder 38 and the scraper 42 and the positions of the scraper holder 40 and the scraper 44 are interchanged. In the end effector 20', the pair of scrapers 42 and 44 extend so as to separate from each other as extending from the proximal ends 46a and 50a toward the distal ends 48b and 52b.

The pair of scrapers 42 and 44 may be arranged symmetrically to each other with respect to the axis A2. Also in the end effector 20', the processor 60 can operate the moving mechanism 18 to rotate the base 34 between the first orientation OR1 in which the distal end 48b of the scraper 42 is closer to the surface Q of the workpiece W than the distal end 52b of the scraper 44 and the second orientation OR2 in which the distal end 52b of the scraper 44 is closer to the surface Q of the workpiece W than the distal end 48b of the scraper 42.

Note that in the end effector 20', similarly to the above-described end effector 100, the scrapers 42 and 44 may be disposed at the base 34 so as to be movable along the axis A3 direction, and the scrapers 42 and 44 may be rotatably disposed at the base 34. In this case, the end effector 20' may further include the scraper driving units 102, 104, and 106 described above.

In the embodiment described above, a case has been described in which the wrist 30 (i.e., the end effector 20) is disposed at the distal end of the upper arms 28 so as to be rotatable about the axis A1. However, the wrist 30 may be non-rotatably fixed to the distal end of the upper arm 28. In this case, the processor 60 operates the turning body 24, the lower arm 26, and the upper arm 28 to rotate the base 34 between the first orientation OR1 and the second orientation OR2.

The end effector 20, 20', or 100 may include an additional scraper in addition to the scrapers 42 and 44. For example, the end effector 20, 20', or 100 may include a first pair of scrapers 42A and 44A, and a second pair of scrapers 42B and 44B arranged opposite to each other in a direction orthogonal to the axes A3 and A2.

The structures of the end effectors 20, 20', and 100 described above are examples, and various other structures are conceivable. For example, the base 34 and the scrapers 42 and 44 may be configured to extend along a common arc axis. In this case, an assembly of the base 34 and the scrapers 42 and 44 has a substantially C-shaped profile.

In the embodiment described above, a case has been described in which the processor 60 executes the position control and the force control in parallel in the scraping process SC. However, the processor 60 can perform the scraping process SC by executing only the position control. In this case, by appropriately setting a plurality of teaching points $TP_n$ with respect to the surface Q of the workpiece W, the pressing force F during the scraping process can be controlled as illustrated in FIG. 17 or FIG. 18. In this case, the force sensor 14 can be omitted from the robot system 10 or 80.

For example, the force sensor 14 may be interposed between a work cell and the robot base 22, or may be disposed at any portion of the robot 12. The force sensor 14 may be provided, not only at the robot 12, but also at the workpiece W. For example, the pressing force F can be detected by interposing the force sensor 14 between the workpiece W and a placement surface on which the workpiece W is placed. The force sensor 14 is not limited to a six-axis force sensor, and may be, for example, a single-axis or a three-axis force sensor, or may be any sensor capable of detecting the pressing force F.

The robot 12 is not limited to being a vertical articulated robot, and may be any type of robot such as a horizontal articulated robot and a parallel link robot, or may be a movement machine including a plurality of ball screw mechanisms. Although the present disclosure has been described above through the embodiments, the above embodiments are not intended to limit the invention as set forth in the claims.

REFERENCE SIGNS LIST 10, 80 Robot system
12 Robot
14 Force sensor
16 Control device
18 Moving mechanism
20, 20', 100 End effector
34 Base
42, 44 Scraper
60 Processor
82 Cleaning device

The invention claimed is:

1. A robot configured to perform a scraping process to scrape and smoothen a surface of a workpiece, the robot comprising:
    a base;
    a pair of scrapers disposed at the base so as to be opposite to each other, each of the pair of scrapers having a proximal end connected to the base and a distal end configured to scrape the surface, the pair of scrapers extending so as to approach or separate from each other as extending from the proximal ends toward the distal ends; and
    a moving mechanism configured to rotate the base between:
        a first orientation in which one of the pair of scrapers is closer to the surface than the other of the pair of scrapers; and
        a second orientation in which the other of the pair of scrapers is closer to the surface than the one of the pair of scrapers,
    wherein each of the pair of scrapers includes:
        a handle provided at the base and defining the proximal end; and
        a blade immovably fixed to the handle and defining the distal end.

2. The robot of claim 1, wherein the base extends along a first axis,
    wherein the pair of scrapers are arranged to be opposite to each other in a direction of the first axis, and
    wherein the moving mechanism rotates the base about a second axis orthogonal to the first axis.

3. The robot of claim 2, wherein the pair of scrapers are arranged symmetrically to each other with respect to a third axis orthogonal to the first axis and the second axis.

4. The robot of claim 1, wherein at least one of the pair of scrapers is movably disposed at the base such that a spacing between the pair of scrapers is variable.

5. The robot of claim 1, wherein at least one of the pair of scrapers is rotatably disposed at the base.

6. A robot system comprising:
    the robot of claim 1; and
    a control device configured to control the robot,
    wherein the control device controls the moving mechanism so as to:
        execute a first scraping process by pressing the distal end of the one of the pair of scrapers against the surface and moving the base in a first direction, while arranging the base at the first orientation;
        rotate the base from the first orientation to the second orientation, after the first scraping process; and
        execute a second scraping process by pressing the distal end of the other of the pair of scrapers against the surface and moving the base in a second direction opposite to the first direction, while arranging the base at the second orientation.

7. The robot system of claim 6, further comprising a cleaning device having an opening disposed between the distal ends of the pair of scrapers, and configured to suction chips produced by the scraping process through the opening or blow away the chips with a fluid sprayed from the opening.

8. A method of performing a scraping process to scrape and smoothen a surface of a workpiece, using the robot of claim 1, in which a processor controls the moving mechanism so as to:
    execute a first scraping process by pressing the distal end of the one of the pair of scrapers against the surface and moving the base in a first direction, while arranging the base at the first orientation;
    rotate the base from the first orientation to the second orientation, after the first scraping process; and
    execute a second scraping process by pressing the distal end of the other of the pair of scrapers against the surface and moving the base in a second direction opposite to the first direction, while arranging the base at the second orientation.

9. A computer-readable recording medium configured to record a computer program causing the processor to execute the method of claim 8.

* * * * *